INVENTORS
JACK H. TERRY
JOHN A. DIMOND
BY ARMISTEAD WHARTON

ATTORNEYS

INVENTORS
JACK H. TERRY
JOHN A. DIMOND
ARMISTEAD WHARTON
BY
ATTORNEYS

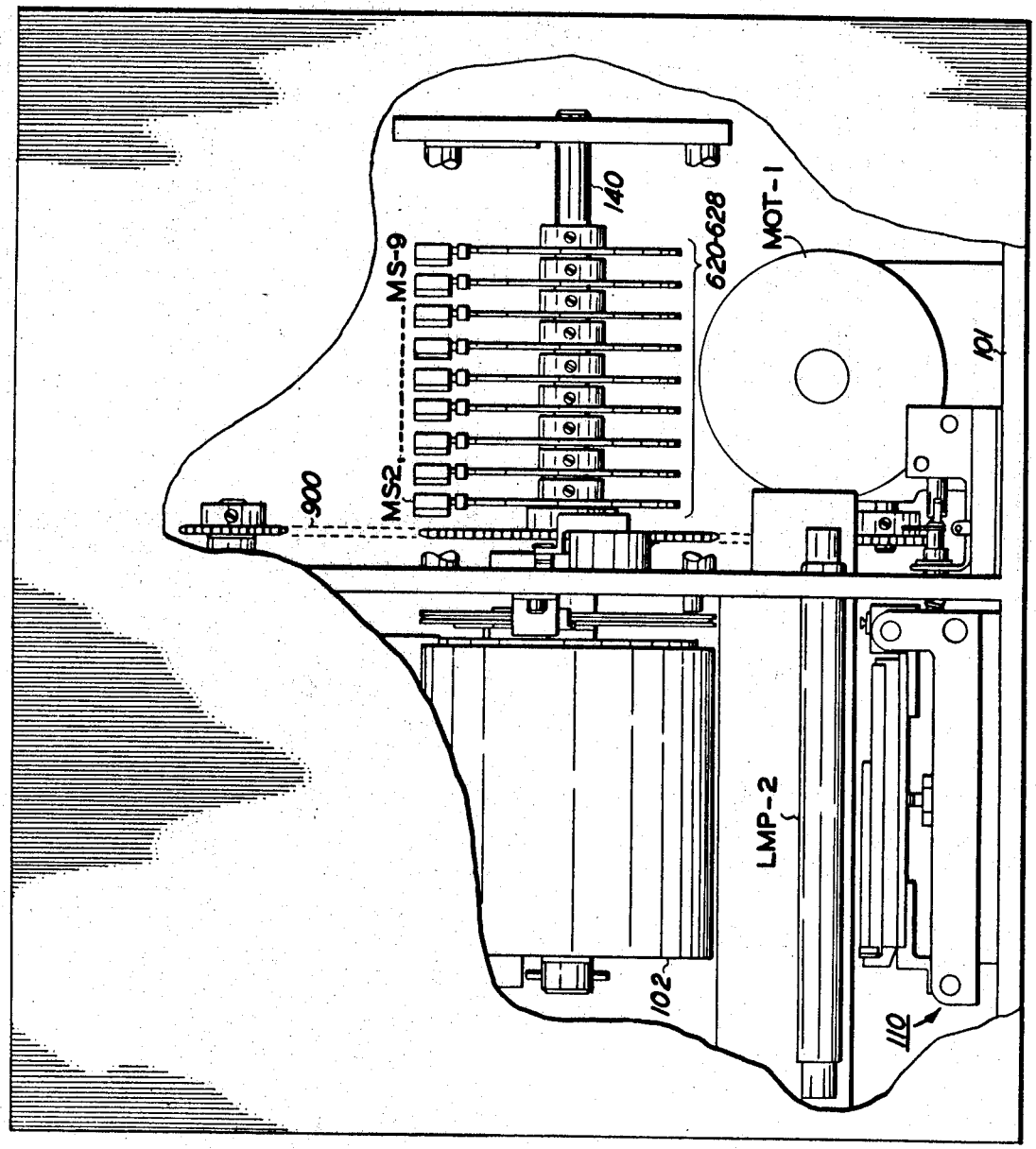

Oct. 27, 1970  J. H. TERRY ET AL  3,536,395

TRANSACTION RECORDING APPARATUS AND SYSTEM

Filed Oct. 25, 1967

REGISTER NUMBER — 7342
DATE — 03-09-67
TRANSACTION NUMBER — 546

BURTON L. JONES  123 31 653 — CUSTOMER NUMBER
10 TALL TREE LANE
FAIRPORT, N.Y. 14450

TAKE    SEND        CHARGE  CASH

HANDBAG        782533434              X
BLACK LEATHER
DEPT 78                  18.95   18.95

DRESS          781997324              X
GOLD 12
DEPT 78                  25.00   25.00

COAT           782234951              X
OLIVE 14
DEPT 78                 110.00  110.00    —193

GLOVES         781145812              X
BLACK 7
DEPT 78                  14.95   14.95

TIE            218146336              X

DEPT 21                   2.98    2.98

SUB-TOTAL              171.88
SPECIAL CHARGE           1.50
TAX                      8.67
TOTAL SALE             182.05

7843.35
391.50   — ACCUMULATOR CONTENTS
71.50
8306.35

INVENTOR.
JACK H. TERRY
JOHN A. DIMOND
BY ARMISTEAD WHARTON

ATTORNEYS

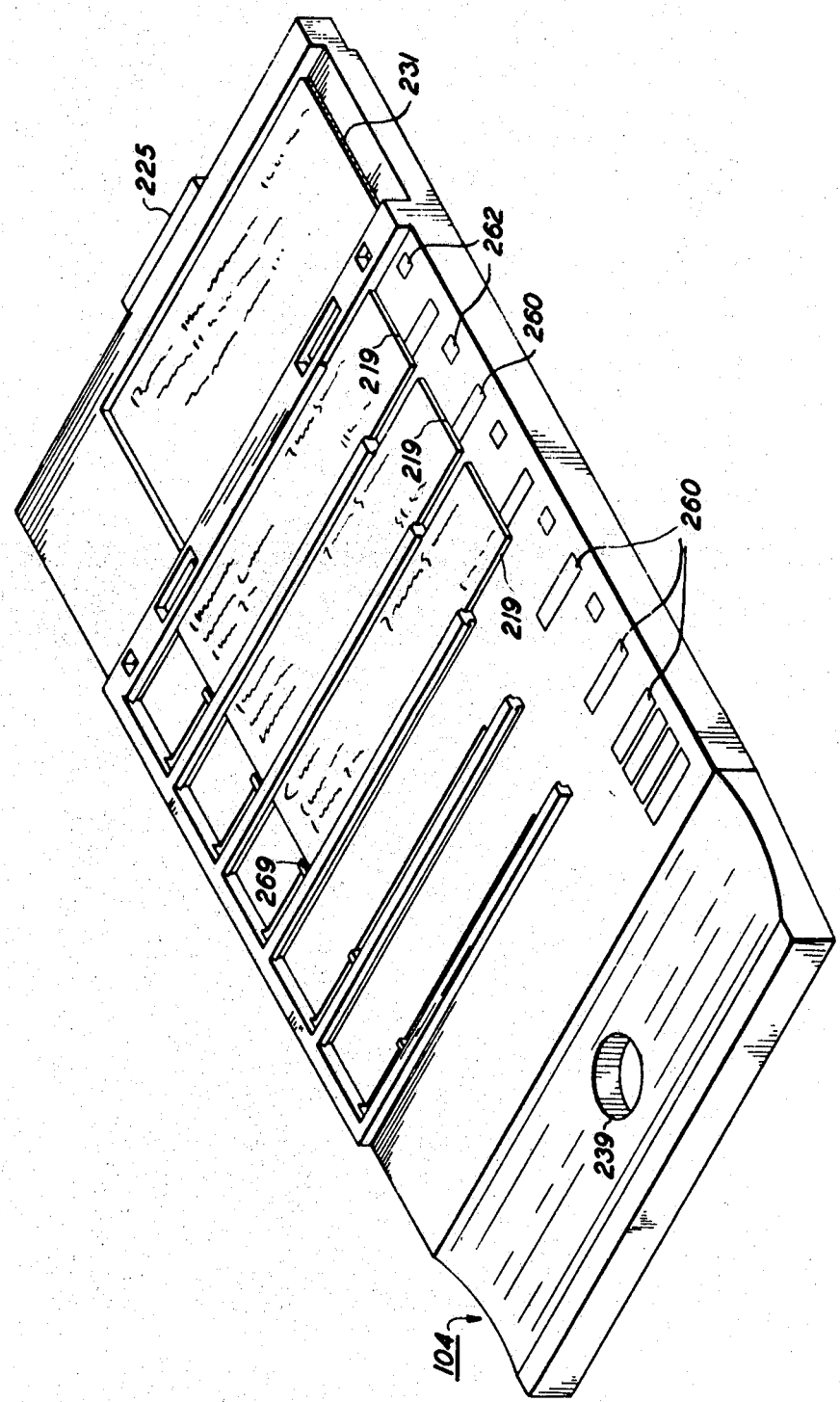

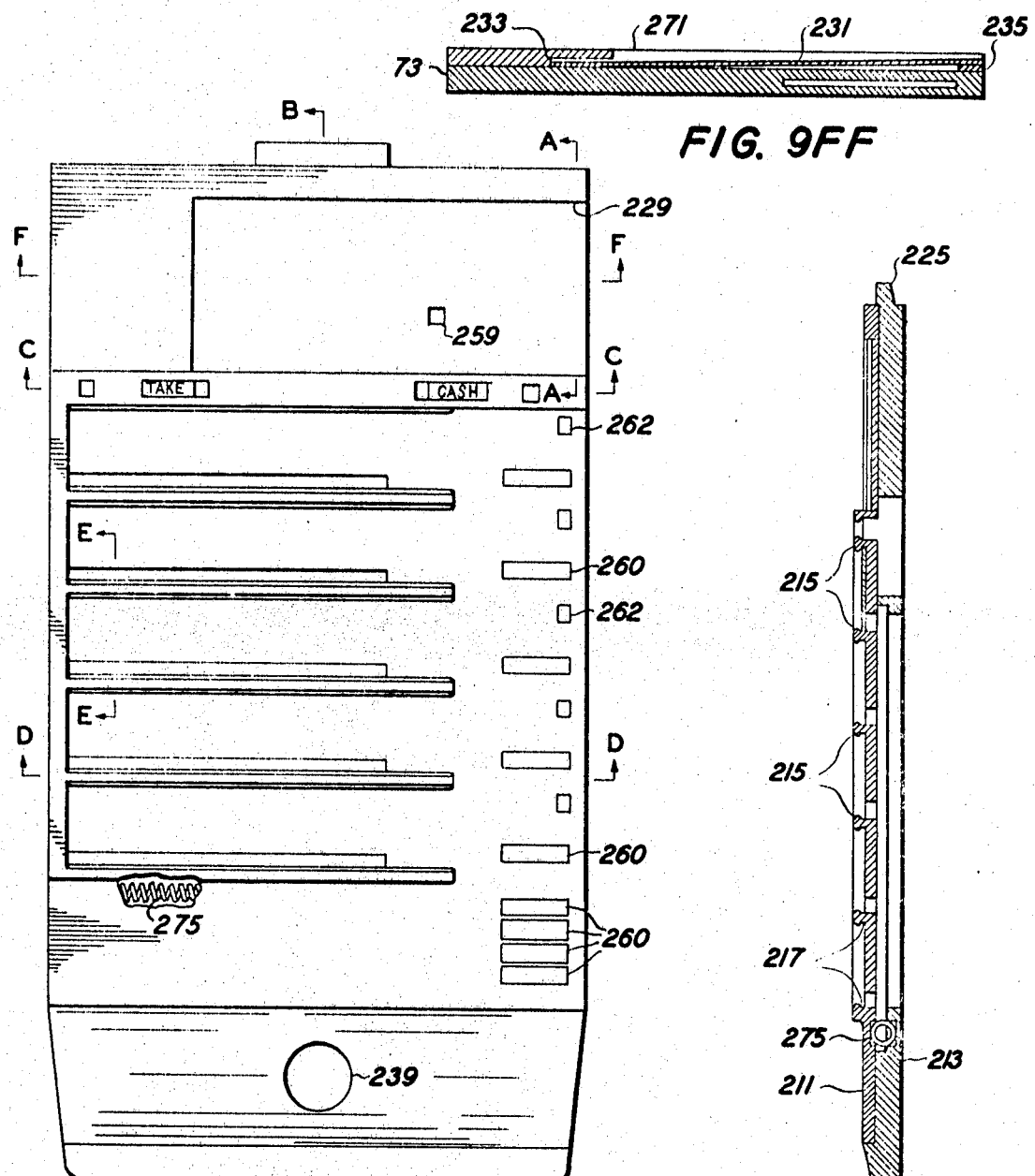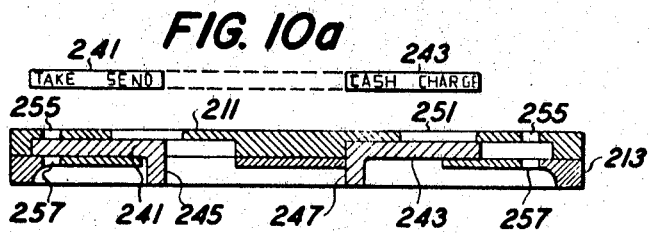

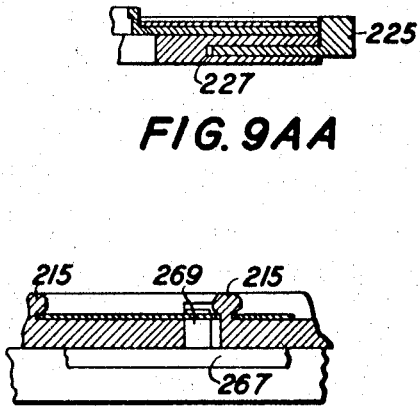
FIG. 9AA
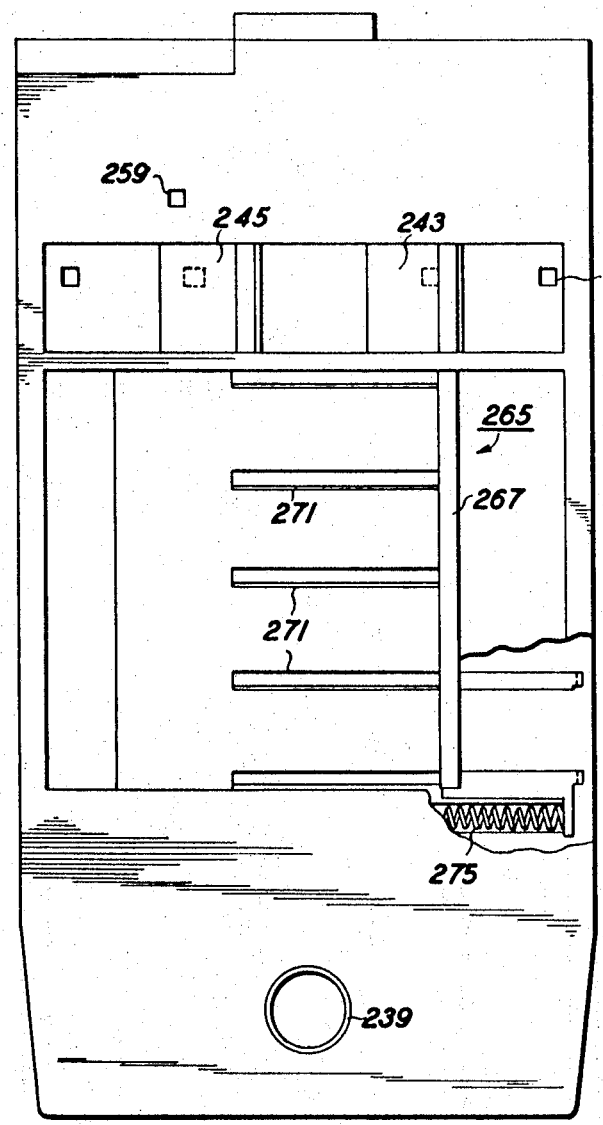
FIG. 9EE
FIG. 10
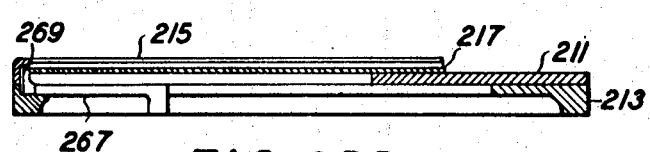
FIG. 9DD

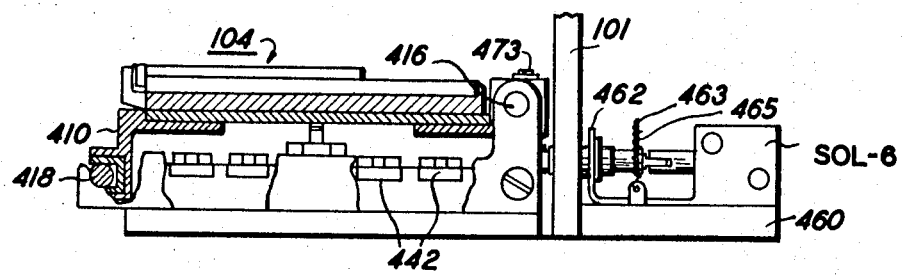
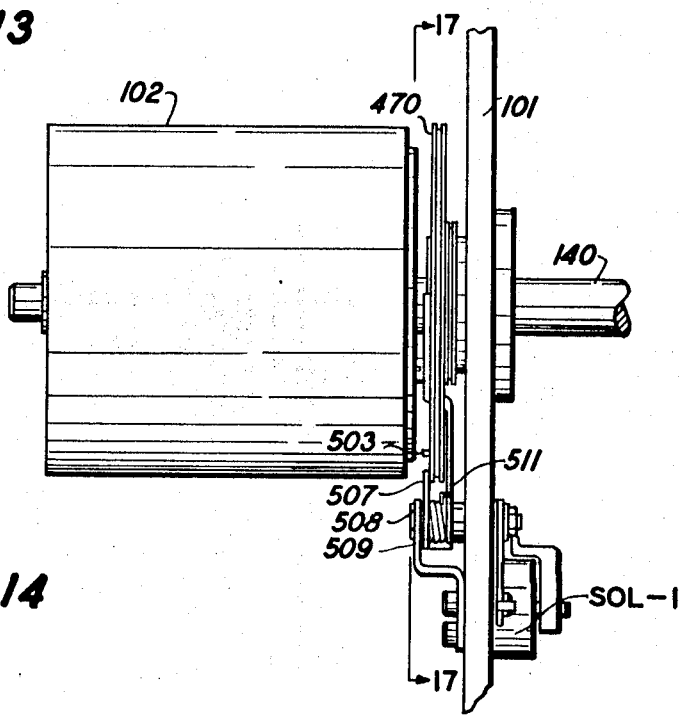
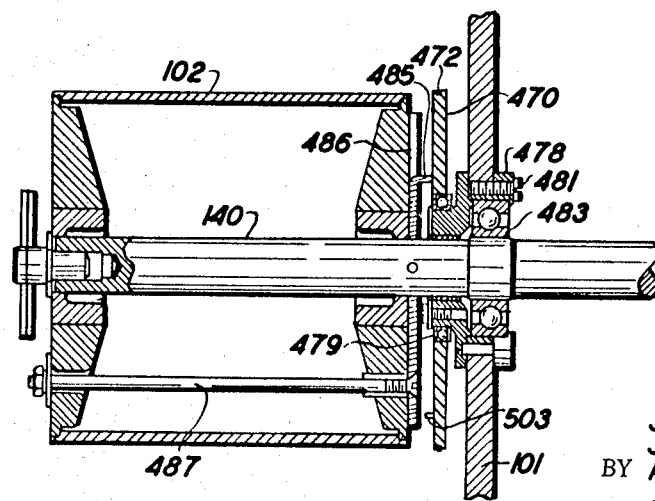

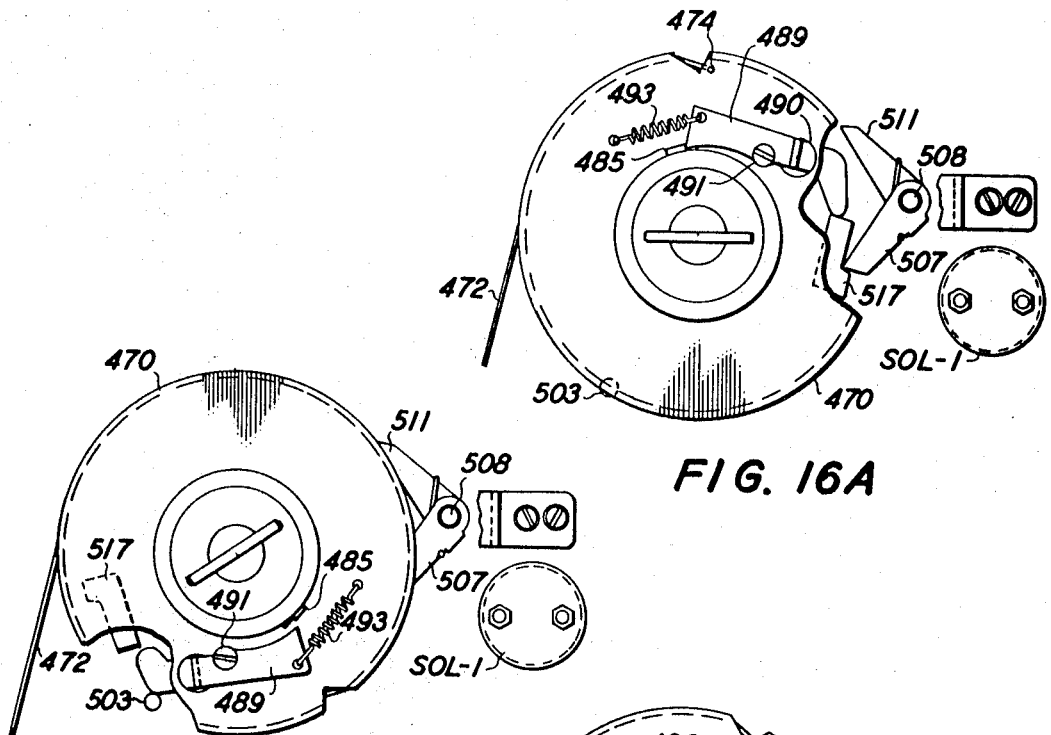
FIG. 16A
FIG. 16B
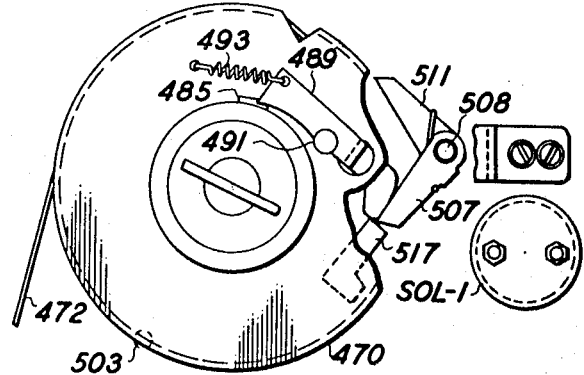
FIG. 16C
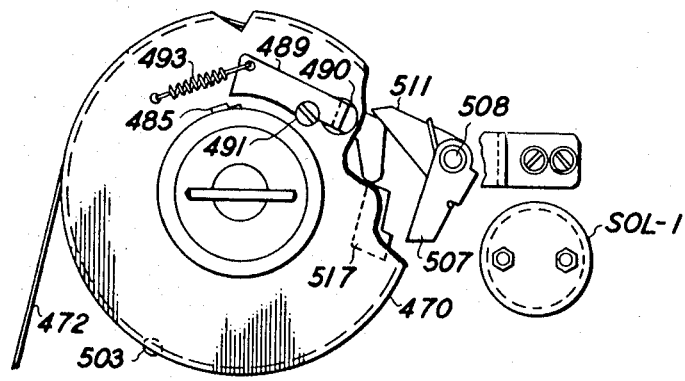
FIG. 16D

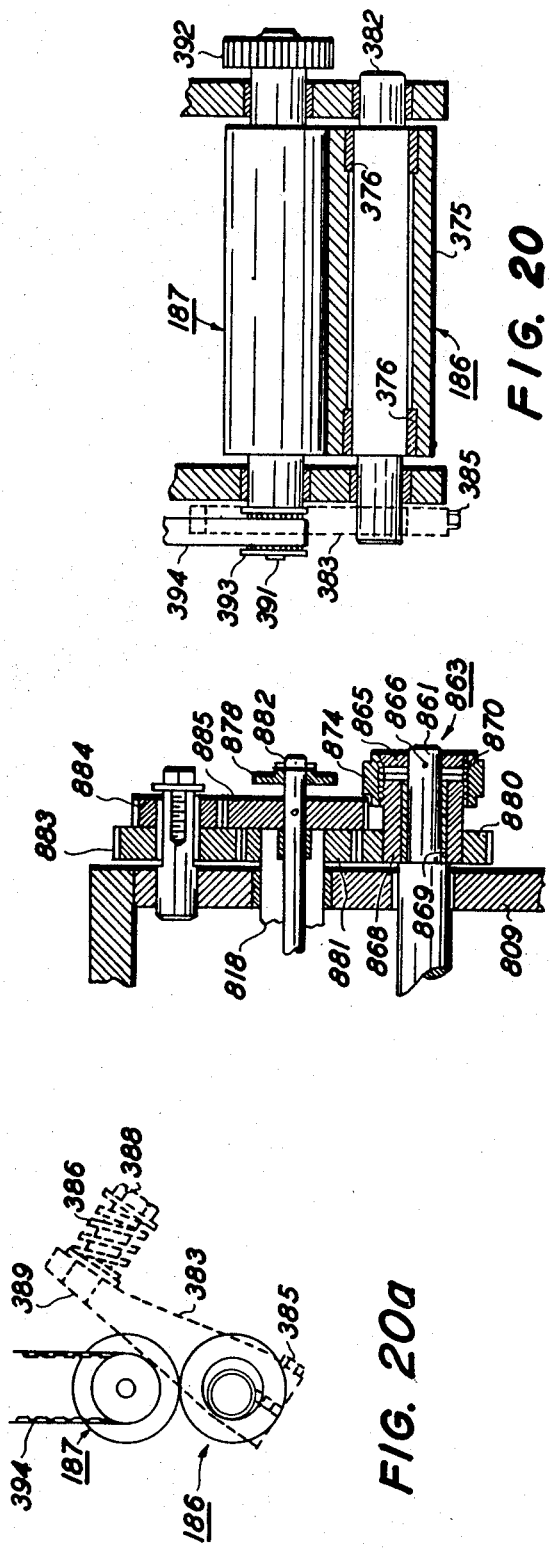

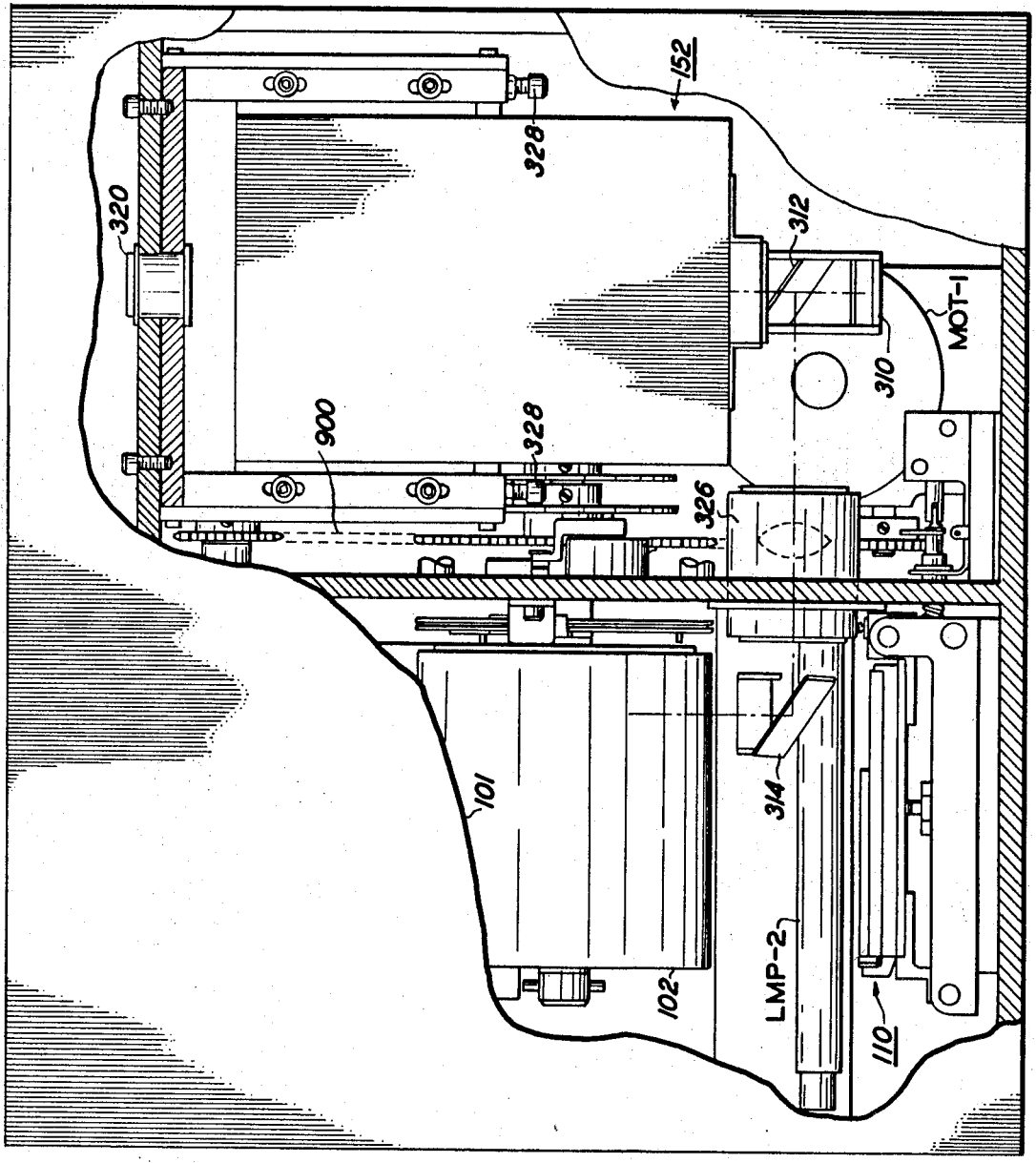

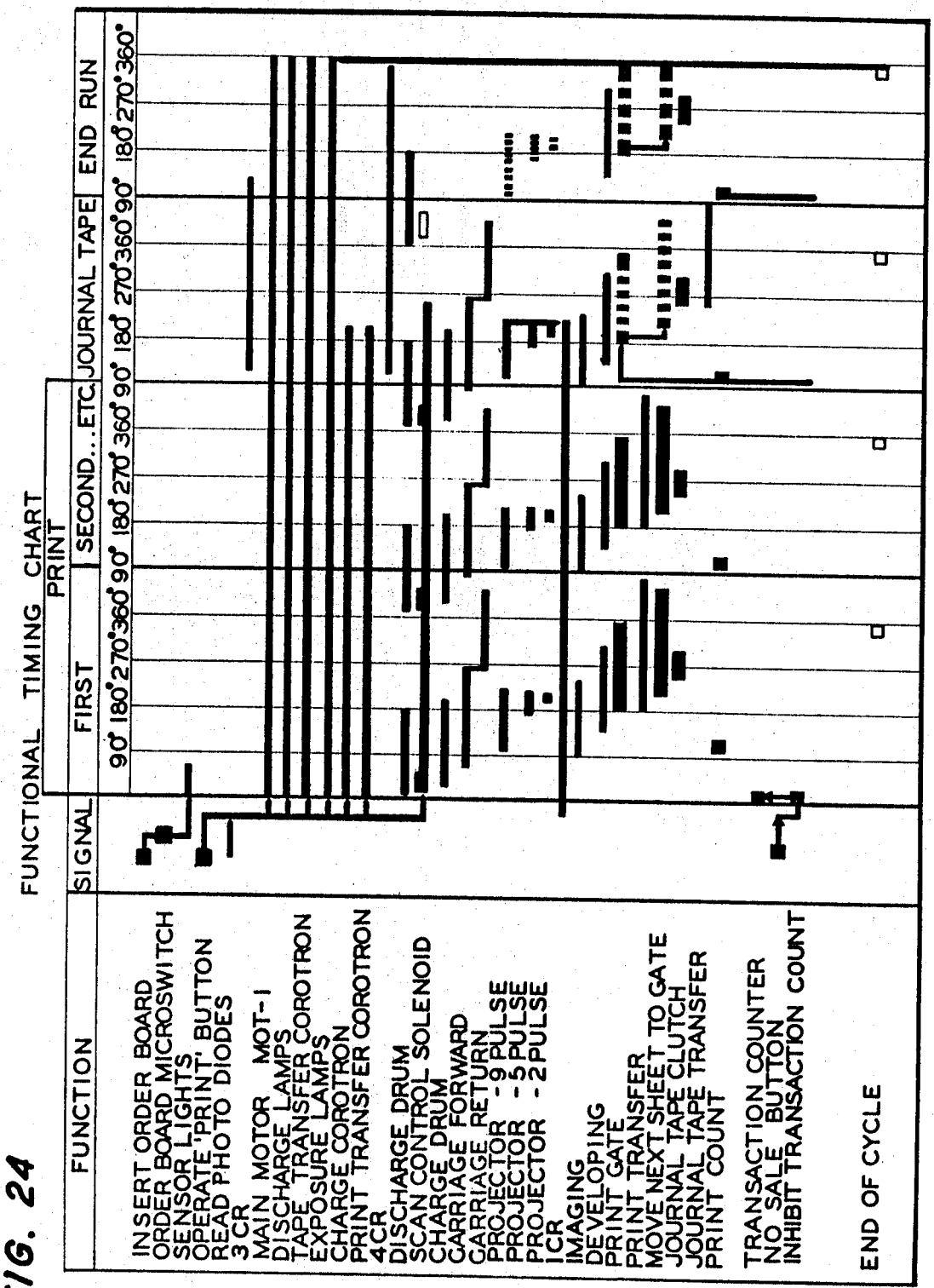

United States Patent Office 3,536,395
Patented Oct. 27, 1970

3,536,395
TRANSACTION RECORDING APPARATUS AND SYSTEM
Jack H. Terry and John A. Dimond, Pittsford, and Armistead Wharton, Henrietta, N.Y., assignors to Xerox Corporation, Rochester, N.Y., a corporation of New York
Filed Oct. 25, 1967, Ser. No. 678,004
Int. Cl. G03g 15/00
U.S. Cl. 355—3                               7 Claims

ABSTRACT OF THE DISCLOSURE

Apparatus for recording business transactions as permanent visual records of credit or cash sales and as an optical input for computer processing of merchandise and accounts receivable control information. A composite image is formed of information assembled on a platen board which is positioned at a first exposure station in the recording apparatus where it is scanned for projection onto a moving photoreceptor and information from a data projector which is positioned at a second exposure station. A logic circuit controls the information display in timed relation to the movement of the photoreceptor. Information imaged by the display is supplied via a keyboard on the control panel of the recording apparatus.

---

This invention relates to data capturing and, more particularly, to novel apparatus for recording business transactions as permanent visual records of credit or cash sales and as an optical input for computer processing of merchandise and accounts receivable control information.

Today, as never before, retailing businesses are experiencing a tremendous volume of individual transactions. In department store purchases for example, it is common for customers to charge or pay cash for 3 or 4 items at least once a week. Normally the store clerk prepares a sales slip by manually inscribing the sale information onto a form sheet, a carbon copy of which becomes the customer receipt. In the case of a charge, a credit card is inserted with the sales slip in a manually operated pressure printing device for recording the customer information (name, address and account number). After the sales check is prepared it is then processed, for the most part manually, through various groups of store personnel for inventory and accounts receivable control. As can readily be appreciated a tremendous volume of individual transcriptions exists for even a small business concern.

With the advent of electronic data processing equipment, it is desirable to utilize one or more computer memories as multiple sales accounting journals and ledgers. Various attempts have been made to combine sales and accounting information at the point of sale into some form of machine readable input data but none have been entirely satisfactory.

One technique at capturing merchandise data at the point of sale has been by print punch price tickets. As a unit of merchandise is sold, a ticket is stubbed and placed onto a spindle holder. At the end of the day, the tickets are taken to a central location where they are converted to magnetic tape for processing into a computer. While this system has certain merit, it has been found that ticket collection is not complete resulting in inaccurate data acquisition.

Still another technique has been to use paper tape punch devices attached to a cash register. Each punched paper tape shows beginning and ending dollar accumulation for all sales data registered for the day. This must then be converted into machine readable language. Normally, the paper tape does not include accounts receivable information which must now be completed manually.

In accordance with the present invention, data capturing at the point of sale is provided by a novel transaction recorder which produces a machine readable input journal tape for automatic processing of both merchandise inventory control and accounts receivable information. More than this, high quality readable copies are produced for customer and business use rapidly and accurately with predominantly fixed information which minimizes human error at the point of sale where it is most likely to occur.

It is therefore an object of this invention to improve recording apparatus.

It is another object of this invention to enable data capturing for accounting and merchandise inventory control.

It is another object of this invention to compute and record sales transactions more accurately and rapidly than heretofore with a minimum of effort by sales clerks.

It is another object of this invention to produce automatically multiple high quality permanent readable records of a completed sales transaction at the point of sale.

Still another object of the invention is to produce a journal tape record of sales transactions at the point of sale adapted for automatic computer processing of merchandise control and accounts receivable information.

For a better understanding of the invention as well as other objects and further features thereof, reference is had to the following detailed description of the invention to be read in connection with the accompanying drawings, wherein:

FIG. 6 is an end view of the recording apparatus with housing broken away;

FIG. 7 illustrates a typical cut sheet copy and journal tape produced from the recording apparatus.

FIG. 8 is a perspective view of the order board.

FIG. 9 is a top plan view of the order board;

Figure 11:
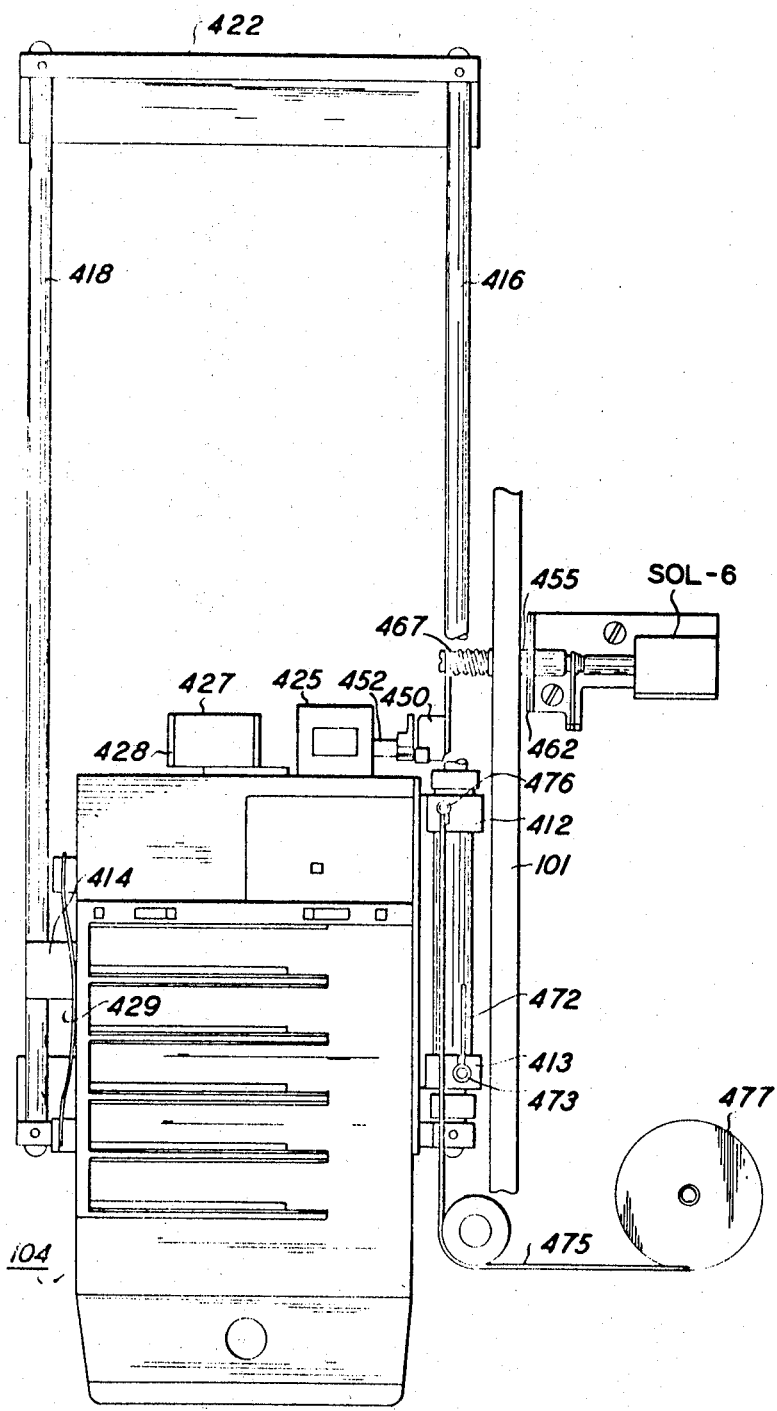
Figure 12:
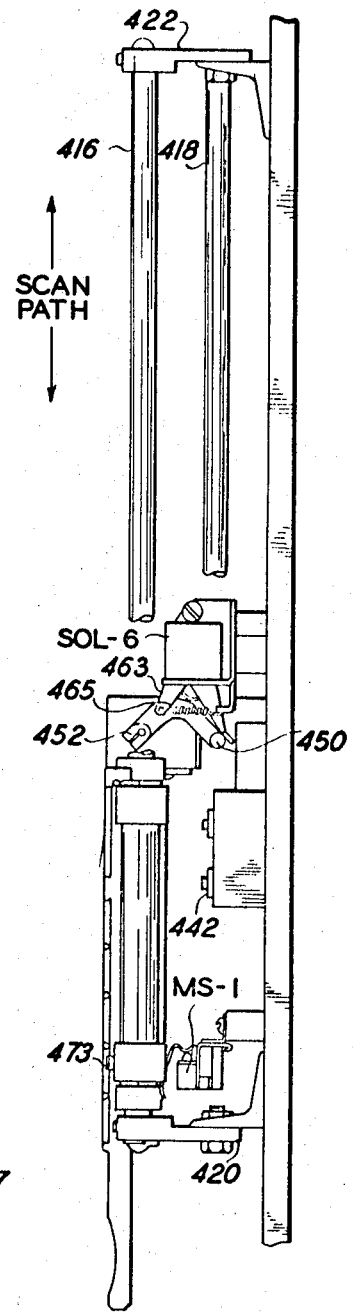
Figure 17:
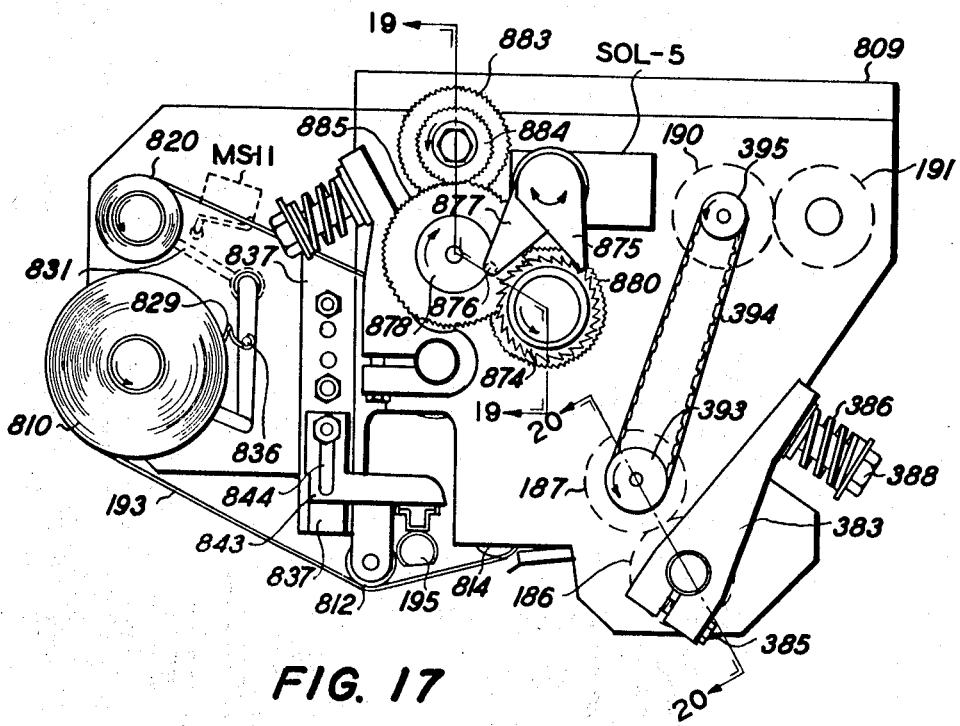
Figure 18:
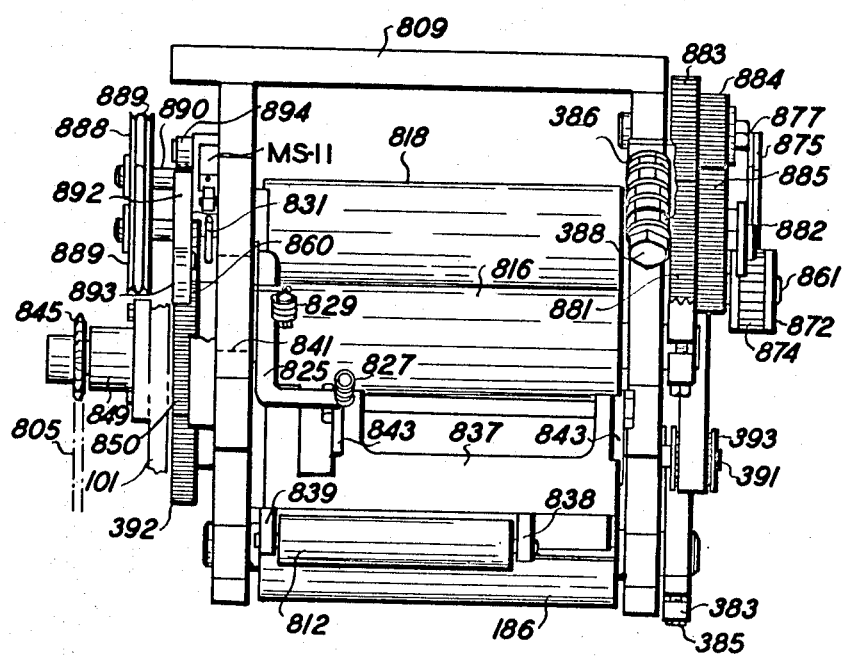
Figure 22:
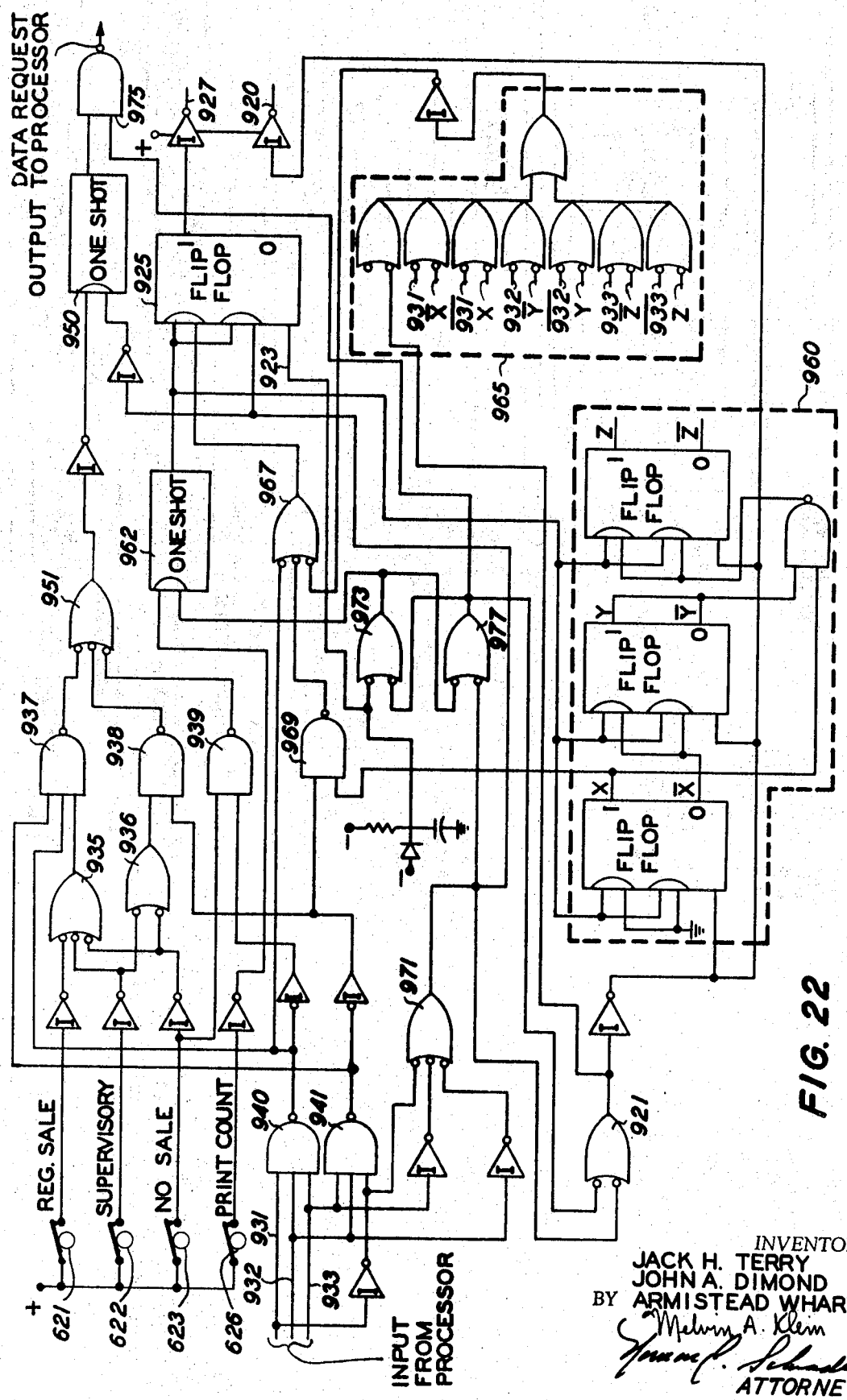
Figure 23:
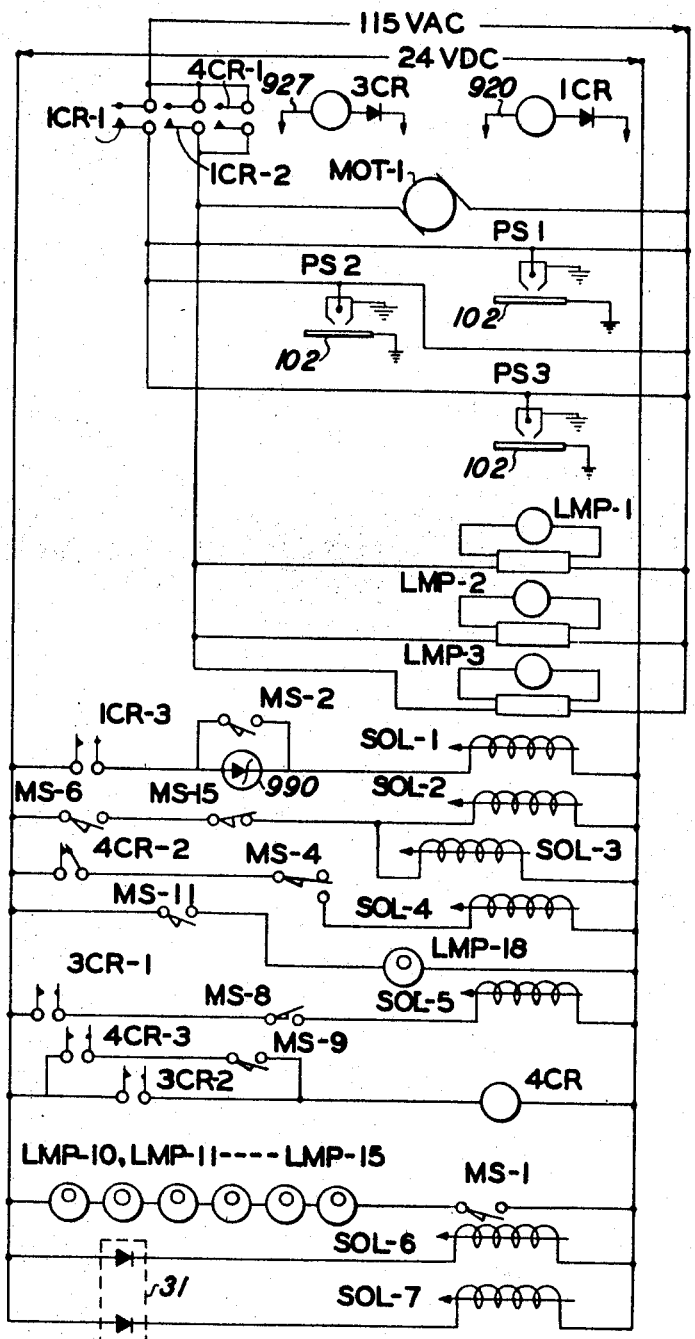

FIGS. 9AA–9FF are sections of FIG. 9 taken along lines indicated in FIG. 9;

FIG. 10 is a bottom plan view of the order board illustrating details of the ticket ejection assembly;

FIG. 10a is a plan view illustrating details of the order board slide members;

FIGS. 11, 12 and 13 are top, side, and end views, respectively, of the order board carriage assembly, parts of which are shown in section;

FIG. 14 illustrates the scan drive mechanism for the carriage assembly;

FIG. 15 is a sectional view of the scan drive mechanism;

FIGS. 16a, 16b, 16c and 16d illustrate similar views of portions of the scan drive mechanism in scan operation sequence;

FIGS. 17 and 18 are side and end views, respectively, of the journal tape transport assembly;

FIG. 19 is an enlarged sectional view of the clutching arrangement for the journal tape assembly taken along line 19—19 of FIG. 17;

FIGS. 20 and 20a are sectional and end views, respectively, of the pressure fixing mechanism with FIG. 20 being a section taken along line 20—20 of FIG. 17;

FIG. 21 illustrates a view of the recording apparatus showing in particular the data projector assembly;

FIG. 22 illustrates schematically the copier control logic circuit;

FIG. 23 illustrates schematically the electrical circuit wiring diagram of the copier section of the recording apparatus;

FIG. 24 is a timing diagram of the recording apparatus.

With the present invention merchandise tickets bearing a description of the item and its price, are placed together with a customer identification charge plate on an "order board" which is then inserted into a recorder. Both the tickets and the charge plate are printed with an optical font which is machine readable thereby enabling an in-line input to a computer processing merchandise control and accounts receivable information. Any suitable font can be used, as for example, that described in U.S. Pat. No. 3,217,294 or listed by the American Standards Association. Before insertion of the order board into the recorder, inputs are made to the order board for programming the number of copies to be produced according to a particular transaction. The recorder is of the electrostatic type adapted for automatic operation. It uses a photoreceptor in the form of a xerographic drum for receiving an image of the order board information as well as information supplied by a data projector, which images item price, subtotal, tax and total. Two kinds of copies are produced by the recorder, one being on a cut sheet and the other being on a journal tape which is used for processing merchandise control and accounts receivable in a computer. The number of cut sheet copies produced depends upon the particular transaction as in the case of a charge, delivery, etc.

Before the copier is ready to print, information is supplied to control logic of the recorder by a keyboard operated by the sales clerk. The keyboard is operated to indicate the price for each item purchased, a subtotal, a tax, special charges and a total. As keyboard buttons are depressed, information is transmitted to a memory and digital processor for processing information for later input into components of the recorder. At the same time, each button entry is registered on an electrical optical display which can be observed both by the sales clerk and the customer. As already mentioned an output from the processor is supplied to a data projector which optically projects information onto the moving photoreceptor during the printing cycle.

When the keyboard information has been entered, the recorder is ready for printing. Nothing else must be done by the sales clerk except to wait for the copies and wrap the merchandise which, of course, can be done simultaneously. At the end of the printing cycle, the order board is ejected out of the recorder for easy removal of the merchandise tickets by the sales clerk who is now ready to make the next sale. If desired at the end of a day or after a predetermined time, copies may be made from the information stored in memory units of the processor for providing a sum total of the transactions for that particular recording machine. It will be appreciated that there are very few steps for the sales clerk to perform thereby minimizing the chance for human error. In this manner a permanent record or register is afforded at the point-of-sale for both customer receipt and processing of merchandise and accounts receivable information.

MACHINE EXTERIOR—FIG. 1

The recorder generally designated 10 comprises a housing 11 which forms a light-tight enclosure for the copier section and is conveniently designed for mounting on top of a pedestal or support in the same manner as an ordinary cash register. On the right hand side of the housing looking at the figures is a keyboard 15 which contains pushbuttons 17 for entering information into the transaction recorder prior to the commencement of the printing cycle. On the top portion of the housing is a display section 19 by which information entered from the keyboard can be observed in front of and behind the recorder by the customer and sales clerk. Display section 19 comprises any suitable electrical read-out device for display purposes as, for example, those manufactured under the trade name Read-Outs, by Industrial Electronic Engineering Corp., Van Nuys, Calif. On the lower portion of the housing is a cash drawer 25 which is for storing cash. Just above cash drawer 25 is a slot 27 through which an order board is inserted carrying information in the form of merchandise tickets and also a customer credit card in the case of a credit transaction. The order board is pulled inside the recorder by a scan drive mechanism and copies are produced as will be explained more fully hereinafter. After the print cycle is complete the order board is returned through slot 27. Copies produced in cut sheet form emerge from the recorder through a slot 192 (FIG. 5) formed in the top of the housing. As already mentioned, a copy of each transaction is also produced onto a journal tape which is stored inside of the recorder.

KEYBOARD SECTION—FIGS. 2, 3

Keyboard 15 is made up of push-buttons bearing numerals, item designations, and special types of transaction designations (NO SALE, VOID, etc.). As each button is depressed momentary contact is established with an accumulator register in a memory and digital processor 30 (see FIG. 4) through an interface 31 to enter binary coded information. For a normal transaction the operator first presses the numeral buttons to indicate the price of each item being purchased. When the ITEM ENTRY button is pressed, the price information for each item is entered into the accumulator register. After each item has been entered the SUB-TOTAL button is pressed to sum up the individual items that have already been entered. Subsequent to this, the numeral buttons are again pressed for indicating the tax amount and then the TAX button is pressed for entering the tax amount into the accumulator register. In similar fashion, special charges are entered by first pressing the numeral buttons followed by the SPECIAL CHARGE button. After the tax and special charges have been entered, the TOTAL button is pressed for computing the arithmetic total of the transaction in the processor. Following the entry of all the data a PRINT button is pressed to commence the printing cycle.

A CLEAR button is provided for clearing the accumulator register section of any incorrect item entry. For the entire transaction to be cleared, a VOID button must be pushed. A NO SALE button is provided for the purpose of entering the cash drawer without recording a sale transaction in which case zeros are displayed and printed as will be explained hereinafter.

Figure 5:
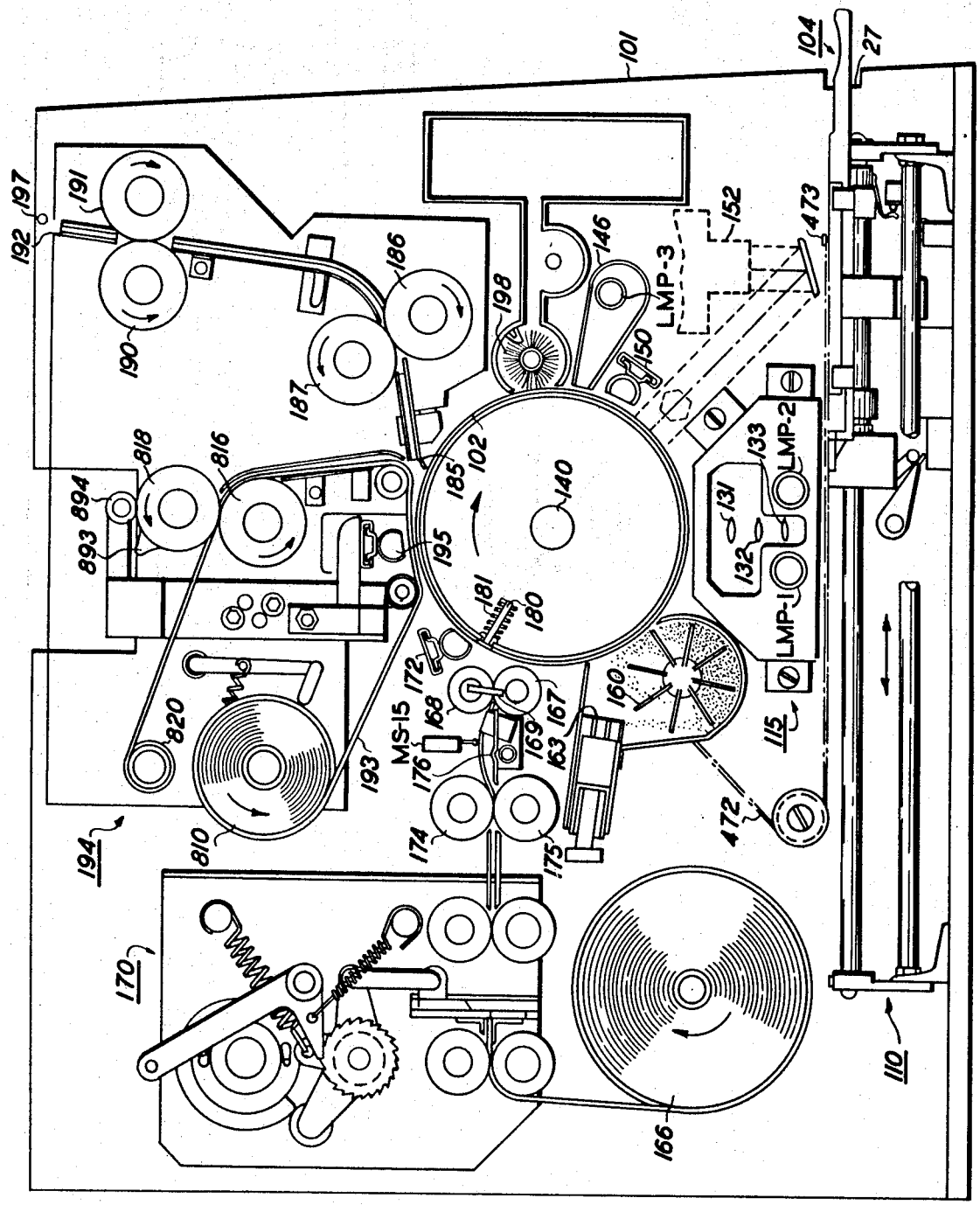
FIG. 5 is a side section view of the recording apparatus illustrating details of components in the copying section.

As can readily be appreciated a relatively few pushbuttons are provided for recording many different types of transactions. In this manner, a transaction may be recorded without necessitating a great number of movements by the transaction recorder operation. It will be appreciated that this reduces significantly the human error normally associated with this kind of operation which is usually done under great duress in a crowded store when most customers are in a hurry. A circuit for the keyboard is illustrated in FIG. 5 which shows momentary contact button switches 17 connected to the input-output bus terminals K of memory and digital processor 30 through diodes 35 to give a binary coded input signal to the memory and digital processor. Located on one side of recorder 10 are a PRINT ACCUMULATOR key operated switch 28 and a PRINT and RESET ACCUMULATOR key operated switch 29 which are used by supervisory personnel to record the total contents of permanent accumulators in process 30. The PRINT and RESET ACCUMULATOR switch resets the accumulators of the processor to zero, while the PRINT ACCUMULATOR switch prints of all the information without destroying the contents of the accumulators.

GENERAL DESCRIPTION OF COPIER SECTION—FIG. 5

The copier section of the transaction recorder comprises a frame 101 supporting an automatic xerographic copier having a xerographic drum 102 which is rotated past processing stations to produce multiple prints of the transaction data. Copiers are produced on cut sheet for customer receipt and store use and also on at journal tape which remains inside the recorder until removed for feeding sale information directly into computer processing equipment.

An order board 104 carrying merchandise and credit information is inserted into an opening 25 in housing 11 where it is received onto a carriage assembly 110 which moves the order board past a scanning station a predetermined number of times as will be more fully explained hereinafter. At the scanning station is an optical assembly 115 which serves to project a flowing image of the order board onto xerographic drum 102 as it is being rotated. Optical assembly 115 comprises a housing 125 in which is positioned a pair of fluorescent-type lamps, LMP-1 and LMP-2 extending in parallel spaced relationship on each side of an optical lens array 130. Lens array 130 comprises a plurality of lens strips 131, 132 and 133 arranged along the length of the drum in superimposed relationship. Lens array 130 is adapted to scan an elemental or discrete area of the order board which is in the focal plane of the lens strip 133 and to project an image of the elemental area upon the surface of xerographic drum 102 is in the focal plane of lens strip 131. The particular optical arrangement and construction of lens strips 131, 132 and 133 is described more fully in copending applications having Ser. Nos. 569,311, and 569,312, filled on Aug. 1, 1966, and copending application Ser. No. 569,925 filed on July 29, 1966. It should be understood that any siutable optical system can be utilized for scanning the order board but that optical assembly 115 is preferred because of its short optical conjugate.

Xerographic drum 102 comprises a layer of photoconductive material, such as vitreous selenium formed on a conductive substrate, and is mounted for rotation on a shaft 140 to pass a series of processing stations as will be described now.

Xerographic drum 102 passes first a charging station at which a uniform electrostatic charge is placed on the surface of the drum by means of a corona generating device or corotron 150.

After charging, the drum is rotated past two exposure stations in rapid succession. At a first exposure station numeral data is flashed from a data projector 152 along one side of the moving xerographic surface as will be explained hereinafter. The other exposure station is located along the optical path of optical assembly 115 which projects a flowing image of the order board superimposed with the image from data projector 152. Light images from the data projector and order board discharge the charged drum where areas of light strike the drum surface thereby creating a composite electrostatic latent image. It will be observed that double exposure of the image areas emanating from the first exposure station does not occur due to the unique construction of the order board as will be explained more fully hereinafter.

After a composite electrostatic latent image is formed, the drum passes a development station at which the latent image is developed. As the drum rotates through the development station, a paddle wheel 160 impels developer material 162 against the surface of the drum. The developer material is composed of a granulated carrier bead and resinous powder or toner material triboelectrically held on the carrier beads. The toner material is electrostatically attracted away from the carrier beads to the areas containing the composite latent electrostatic image and replenished by a dispenser 163. The development station components are described more fully in copending application 502,003 filed on Oct. 22, 1965. It should be understood that any suitable development apparatus as is known to those skilled in the art could be utilized with the invention herein.

As the xerographic drum continues to rotate, it passes a transfer station at which copy sheet cut from a roll 166 is placed onto the drum surface by a pair of register transport rolls 167, 168 moving at the surface speed of the drum. Copy sheet is prevented from advancing through the nip of rolls 167, 168 by a normally closed gate 169 until actuated open by a solenoid SOL-4 as will be explained hereinafter. Cut sheets are supplied to register transport rolls 167, 168 from a web feed and cutter assembly 170 through a pair of feed rolls 174, 175 which advance the sheet over a ripple element 76 causing the sheet to buckle against a microswitch MS-15 to thereby indicate a ready-to-feed condition exists as will be more fully described hereinafter. Web feed and cutter assembly 170 is described in a copending application by Armistead Wharton, Ser. No. 644,474, filed Aug. 30, 1967. It should be understood that this assembly does not form a part of the invention and that any suitable feed device could be used in place of it.

The powder image on the drum surface is transferred to copy sheet by placing an electrostatic charge on one side of the sheet from a transfer corotron 172. The leading edge of the copy sheet is removed from the drum surface by the action of a plurality of plunger members 180 which are held below the surface of the drum by springs 181 until such time as they are actuated by appropriate cam action due to rotation of drum shaft 140. At this time the leading edge is received in a channel 185 which guides the sheet into the nip of pressure rolls 186, 187 which serve to permanently fix the developed image to the copy sheet. A pair of exit rolls 190, 191 serve to push the fixed copy sheet through a slot 192 in the top of the machine where it is deflected into a horizontal position by a deflector bar 197.

After transfer, the drum passes through a cleaning station at which its surface is brushed clean by a cleaning brush 198 to remove residual toner remaining on the drum. Thereafter the drum surface passes a lamp LMP-3 enclosed by a reflective shield 146 with an opening formed therein to illuminate the drum surface thereby removing any residual charge prior to having the drum uniformly charged for the next exposure.

For the last copy of the printing cycle, the developed image is transferred onto a journal tape 193 which is normally out of contact with the drum but is advanced into surface contact with the drum by a journal tape transport assembly 194 as will be understood. A corotron 195 serves to provide the electrostatic transfer charge to attract the image onto the journal tape. After the last copy is made on the journal tape, order board 104 is ejected from the copier section by carriage assembly 110 through opening 25 in the housing to end the printing cycle.

ORDER BOARD—FIGS 8–10

Order board 104 serves as a platen on which sales ticket and credit information is positioned for scanning and also serves as an input device to indicate the number of copies to be produced by the copier section of the recorder. The order board frame is made up of a top plate 211 and a lower plate 213. Top plate 211 is preferably colored white to increase illumination reflected from the top surface onto the drum surface. Centrally located on the top plate 211 are protruding ridges 215 which form grooves 217 in which merchandise tickets 219 can be received. Tickets 219 extend about three quarters of the width of order board leaving about one quarter of the width to be utilized as a mask for information imaged onto the drum by data projector 152 as will become more apparent.

At the forward or leading edge of the order board is an elongated member 225 on which a clerk identification number may be printed. Member 225 is received in a slot 227 formed in top plate 213. The forward portion of top plate 211 has a recessed portion 229 for insertion of a customer credit card 231 which is snugly received at one end in a channel 233. The opposite end of credit card 231 is raised slightly by a lip portion 235 on the top plate to apply a frictional holding force of the credit card within channel 233. At the trailing edge of the order board is a concave portion having opening 239 formed therein to facilitate handling of the order board.

The order board serves as a device for programming in the number of copies to be produced in the recorder. To this end a pair of slide members 241 and 243 received in slots formed by top plate 211 and bottom plate 213 are utilized as input devices. Slide members 241 and 243 are easily manipulated in a direction transverse to the longitudinal axis of the order board by extensions 245, 247, respectively which are easily grasped from the bottom of the order board. Slide member 243 designates CASH or CHARGE while slide member 241 is used to designate TAKE or SEND. It will be appreciated that the number of copies produced varies with the type of transaction as both CHARGE and SEND require additional copies for audit and mechandise handling purposes.

Top plate 211 has a pair of slots 251 formed therein through which lettering on slide members 241, 243 is easily observed to indicate CASH or CHARGE and TAKE or SEND, respectively. Formed in top plate 211 is a pair of apertures 255 which are in registration with another pair of apertures 257 formed in lower plate 213. As slide members 241 and 243 are moved to one position to the far left or in the opposite position to the far right, communication between apertures 255, 257 is either open or blocked to thereby allow pre-selected illumination to be received onto a bank of photocells 442 (FIG. 13). Illumination received by the photocells generate signals into memory and digital processor 30 as will be described. In similar fashion an aperture 259 is formed in recessed portion 229 in which credit card 231 is received in registration with another photocell to indicate whether the sale is a credit transaction.

As mentioned above, sales ticket and credit information is copied from merchandise tickets 219 and credit card 231 inserted into the order board. As best seen in FIG. 9 the right side of the copy sheet looking at the figure is where information is recorded from data projector 152. To this end, masking strips 260, which are colored black, are provided where information from the data projector is to be received on the drum so that the drum will not be adversely affected by the order board image in these areas. Aligned with masking strips 260 are marking boxes 262 which serve to project marking indicia onto the drum to indicate a reference mark for the merchandise inventory number which is introduced into the computer processing system as previously mentioned.

In order to permit merchandise ticket 219 to be ejected in a speedy manner, a ticket ejection assembly 265 is provided on the order board. Ticket ejection assembly 265 comprises an elongated arm member 267 to which is connected a plurality of fingers 269 which are received in channels 271 formed in top plate 211. It will now be appreciated that elongated arm member 267 can be easily manipulated in a direction transverse to the longitudinal axis of the board from underneath the board to thereby eject tickets 219 from the order board. A compression spring 275 acts against the movement of arm member 267 returning it to its rest position after discharge of the merchandise tickets. It should be noted that the order board can be made out of plastic or any suitable material. Also top plate 211 and lower plate 213 can be held by any suitable means, such as, an adhesive or screws or alternatively, the order board can be a unitary molded member formed from, for example, an ejection molding process.

ORDER BOARD CARRIAGE AND SCAN DRIVE ASSEMBLY—FIGS. 11–15

Order board 104 is received onto a carriage assembly 110 which pulls it inside of the recorder and then moves it in reciprocating type motion past the scanning station where the order board is scanned a predetermined number of times on the forward stroke in timed relationship with the rotation of the xerographic drum. Referring now to FIGS. 11–15, the carriage assembly comprises a carriage frame 410 mounted for sliding movement along a pair of guide rails 416 and 418. Guide rails 416 and 418 are supported from the main frame by brackets 420 and 422. The carriage frame has bearing housings 412, 413, and 414 (FIG. 11) extending from its sides to enable accurate linear movement of the carriage frame. At the leading edge of the carriage frame is a transaction counter 425 which serves to count the number of the transactions and is actuated in a manner that will be described hereinafter. Adjacent to the transaction counter on the frame is a plate member 427 having guide portions 428 in which the date of the transaction and department number can be inserted as by cards or other suitable devices to be recorded onto the copy sheet and journal tape.

The order board is held firmly in place on the frame 410 by a leaf spring 429 so that it is not jarred during the scanning cycle. Situated below the carriage frame is an array of photocells 442 which receive illumination established by the setting on order board 104 as previously described. At the leading edge of the scan path is a microswitch MS-1 which serves to energize lamps LMPS-10, 11, 12, 13, 14 and 15 (FIG. 23) positioned above the order board.

In the scan path of the carriage frame is a trip lever 450 which engages a counter arm 452 extending from transaction counter 425. It will be appreciated that as the carriage frame travels forward, counter arm 452 rides up on trip lever 450 causing a cranking movement to be exerted on the counter arm 452 thereby advancing the transaction counter 425. This will only occur when the carriage frame is moved from its start position because during the scanning cycle the carriage frame does not return to the same position in the scan path until the order board is ejected at which time it moves in an opposite direction.

It is desirable that the transaction counter 425 not be actuated in the case of a NO SALE. To this end trip lever 450 is moved laterally by a shaft 455 in a direction transverse to the scan path out of the way of the carriage frame in response to the actuation of a solenoid SOL-6 triggered by a signal described hereinafter. Solenoid SOL-6 is supported from the main frame on a tubular support 460 which has a bracket 462 extending therefrom for supporting shaft 455. It should be noted that when the carriage frame returns, counter arm 452 passes below trip lever 450 rocking it slightly against the action of a spring 465 extending between a guide 463 and the base of support 460 but not causing a cranking movement of the lever. Shaft 455 is held in its normally extended position by a compression spring 467 which is compressed upon actuation of solenoid SOL-6.

In order to drive the carriage frame 410 a pulley 470 is mounted on an axis concentric with the xerographic drum for movement in synchronization with the drum to drive a cable 472 wound on the pulley. Cable 472 is connected at one end to the carriage frame 410 by means of a pin 473 and at the other end is attached to pulley 470 by means of a pin 474. For the return stroke, a cable 475 pinned to the carriage frame by a pin 476 is connected to a spring 477 which urges the return of the carriage first to a scan return position and ultimately to an order board eject position in a manner that will become apparent hereinafter.

Pulley 470 is free to rotate about a bushing 478 on ball bearing ring 479. Bushing 478 is secured to the main frame by screws 481 and receives a ball bearing ring 483 on which the shaft of the xerographic drum is rotatably supported. Movement is imparted to the pulley 470 by a dog 485 which is integral with a disc 486 connected to the frame of the xerographic drum by elongated bolts 487. The carriage frame is moved forwardly for scanning and then returned by the action of spring 477 to an intermediate position before starting the next scan until at the end of the printing cycle the order board is finally ejected. The sequence of operation can best be understood from FIGS. 18a, 18b, 18c, and 18d which show the various positions of the pulley during a scanning cycle. Dog 485 is normally in engagement with arm 489 carried on the surface of the pulley and extending through an opening 490 in the pulley so as to be exposed to both surfaces of the pulley. Arm 489 is pivotable about a pin 491 and is normally urged into contact with dog 485 by a tension spring 493. Arm 489 engages dog 485 carrying pulley 470 in the same direction as the rotation of the xerographic drum. As the pulley continues to rotate, arm 489 contacts a pin 503 secured on the main frame which cams the arm about its pivot axis out of engagement with a dog 485. At this point the carriage frame has reached the end of the scan and spring 477 returns the carriage frame and pulley 470 to a position shown in FIG. 18c. A pin 505 on the pulley engages an arm 507 preventing return of the pulley to the starting position. Arm 507 is freely pivotable on shaft 508 and is engaged by a torsion spring 509 which allows arm 507 to be displaced from the path of pin 505. It should be noted that this restriction on the pulley enables the order board to remain inside the machine and also ensures that transaction counter 425 is not advanced on the next forward movement of the carriage frame.

It will be appreciated that pulley 470 is driven forward when contact is made with dog 485 on the continuously rotating xerographic drum. This sequence of operation is continued for each scan of the order board until the last scan when arm 507 is moved out of the path of pin 505 in response to a signal from a rotary solenoid SOL-1 which actuates arm 511 engaging arm 507 thereby displacing arm 507 from the path of pin 505. This allows spring 477 to move the pulley until a fixed plate 517 on the pulley abuts pin 503 arresting the pulley at its starting position. At this time the carriage frame returns the order board to a position extending through slot 25 where it was inserted initially by the sales clerk.

DATA PROJECTOR—FIG. 21

Data projector 152 is an electrical display device adapted for projecting an image onto the xerographic drum. Any suitable display device can be used for this purpose. Preferred display devices are vacuum tube readouts manufactured by the Industrial Electronics Engineers, Inc. Van Nuys, California, NIXIE tubes a trade name of Burroughs Corporation, Detroit, Mich., and electromechanical stroboscopic display devices. A preferred stroboscopic display device is Datastrobe, a trade name of Ratheon Company, Quincy, Mass. Datastrobe is an in-line, in-plane, digital display system and uses a single time shared high speed xenon strobe flash tube in conjunction with an optical system and a character mask affixed to a self-synchronized rotating cylinder to produce an in-line display. To accomplish this, it makes use of a four bit binary coded decimal code that does not require complementary inputs. Datastrobe produces a window signal in which the beginning and end of a channel is identified. Within this window of beginning and end of a channel, numeral identification and activation may be achieved. The tube type readout devices, of course, are activated by appropriate control logic.

Figure 1:
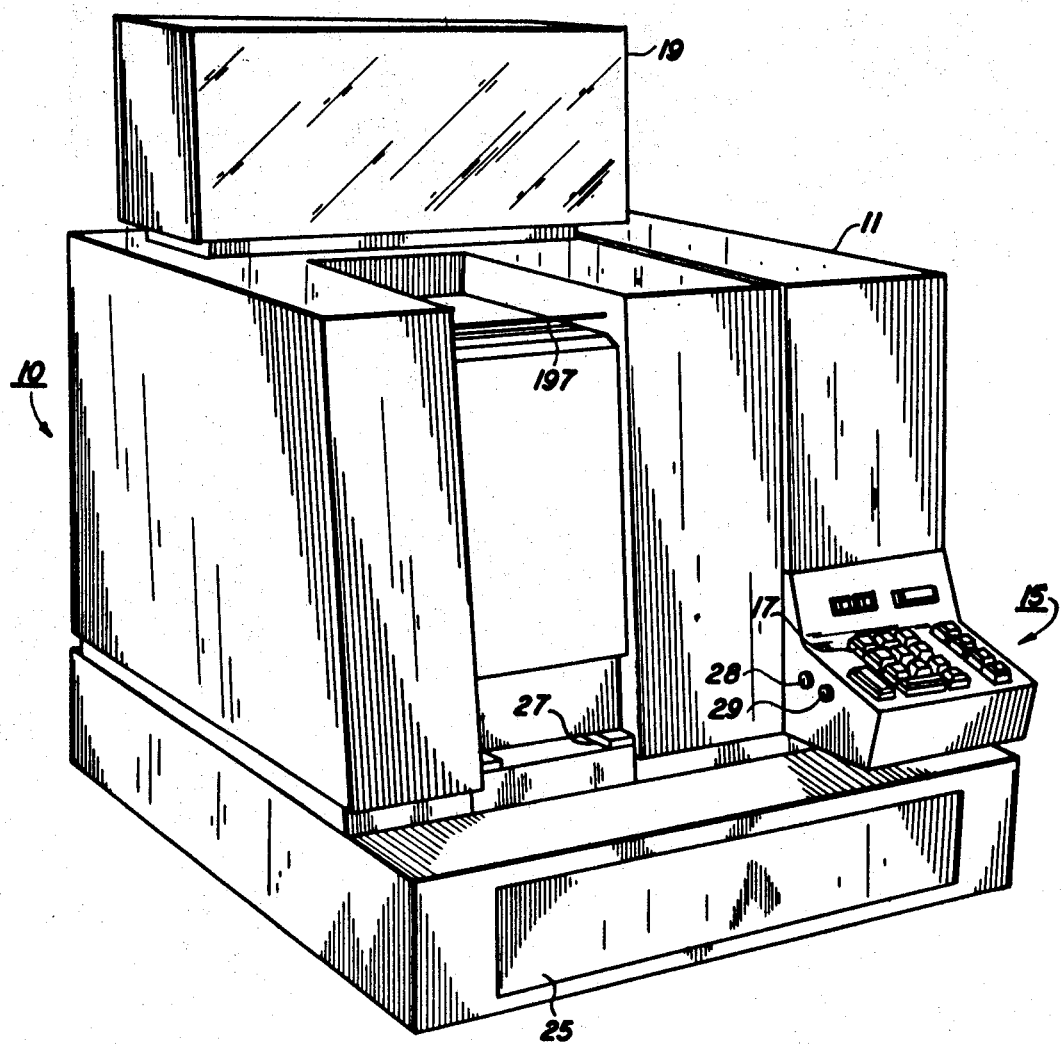
FIG. 1 is a left-hand perspective view of the recording apparatus of the invention.
Figure 2:
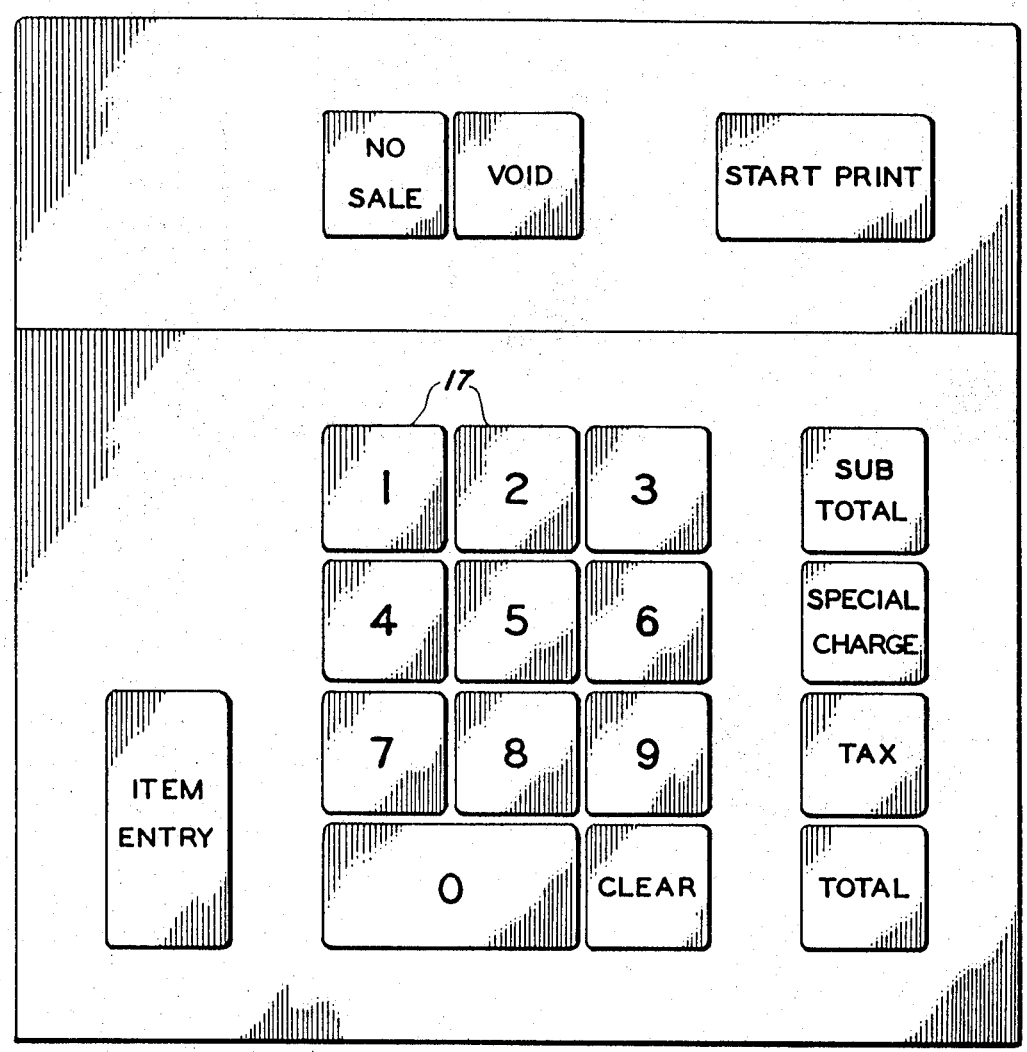
FIG. 2 is an enlarged view of keyboard section of the apparatus.
Figure 3:
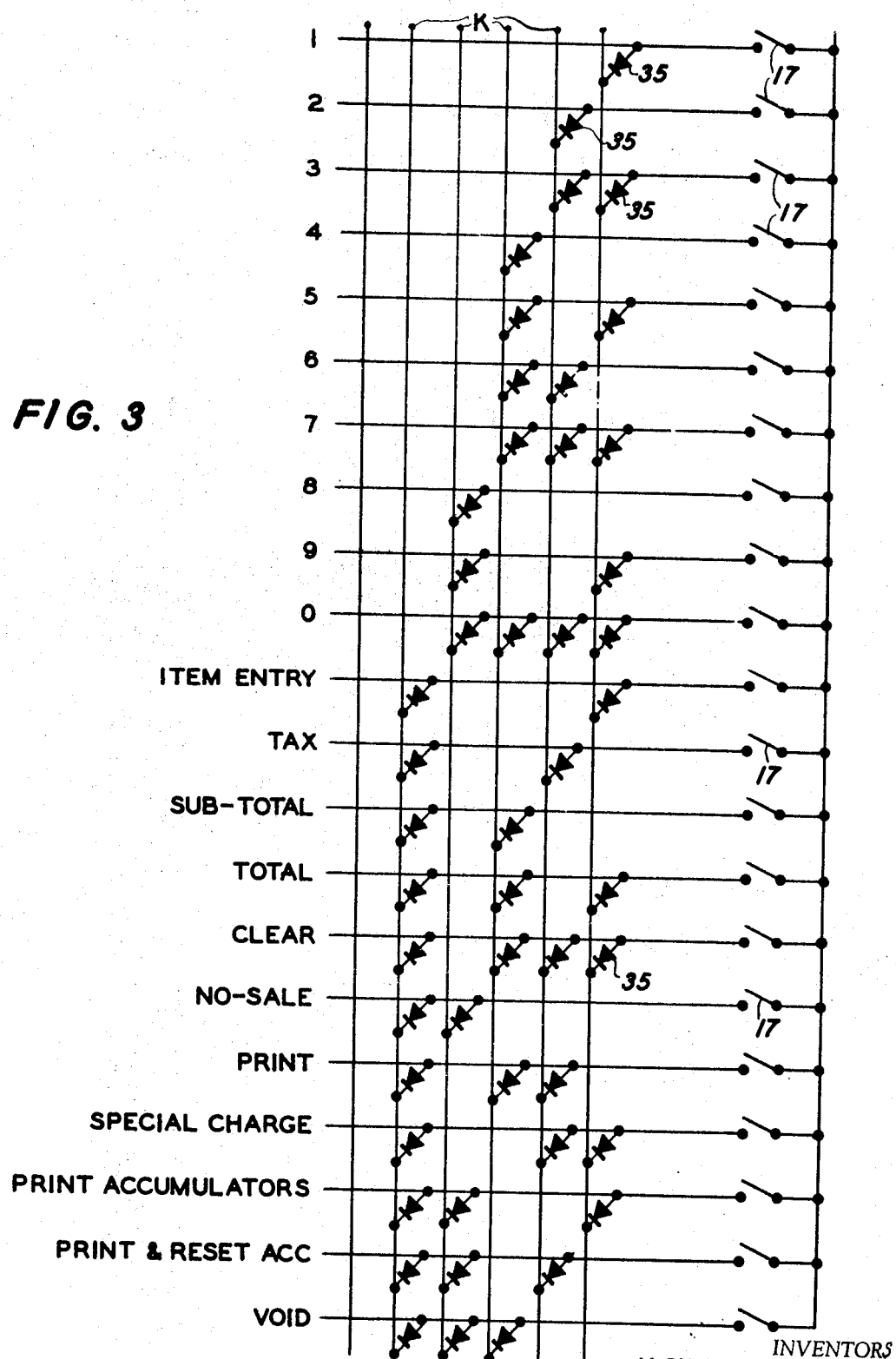
FIG. 3 is a schematic view of the keyboard coding matrix circuit for converting keyed information into binary coded digital information.
Figure 4:
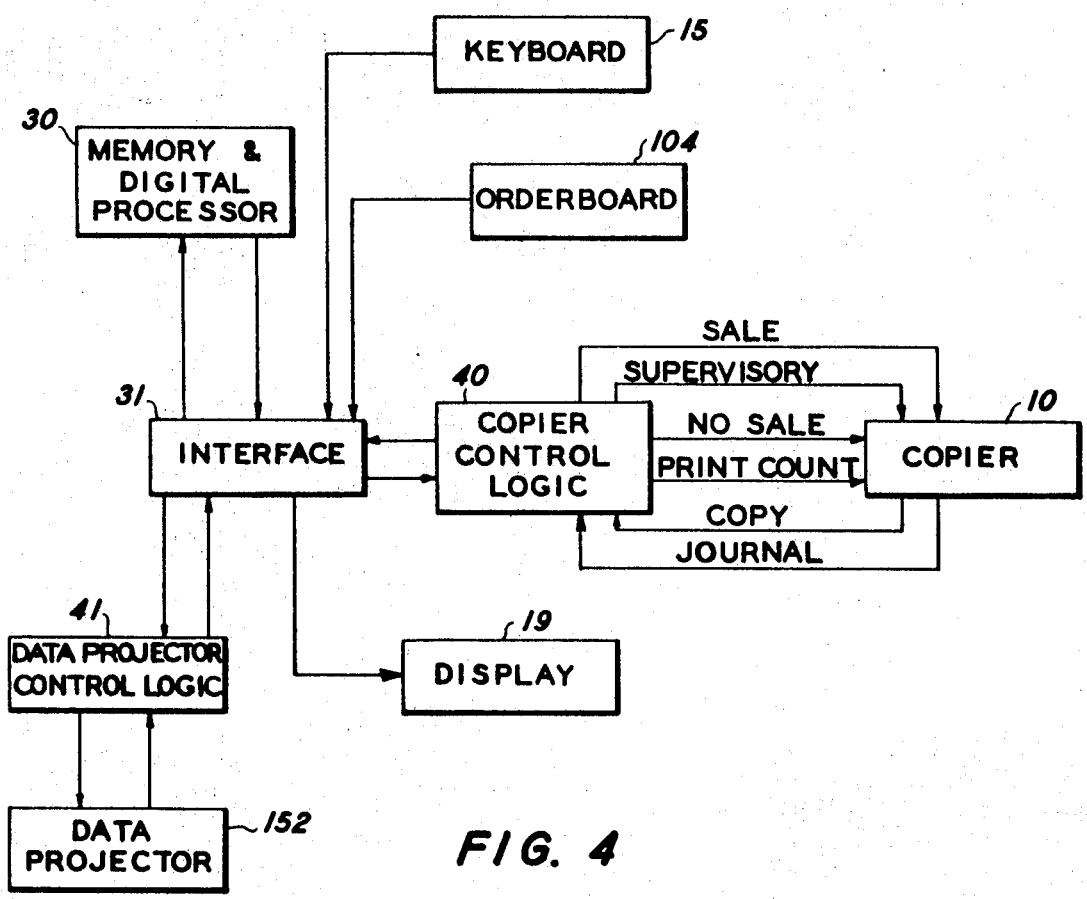
FIG. 4 is a simplified block diagram in accordance with the principles of the invention.

Data projector 152 which is mounted on a support 305 has an optical path to give the proper object distance within the given dimensions of the recorder housing. In this case a projector of the electromechanical stroboscopic type is illustrated in the figures. The print characters project a black image on a transparent surround, such that the character areas on the xerographic drum will remain unexposed and the background will become exposed. The light rays proceed first to a tilted strip reflector 310 and then to another tilted strip reflector 312 which then directs the light rays over to a third tilted strip reflector 314 from which they are directed onto the surface of the xerographic drum. Each of the strip reflectors is tilted in such a way that the optical path approaches 45 degrees (though it may not be precisely of this value) to the vertical from reflector 314 onto the xerographic drum. As the drum is rotated the rays will expose successive portions of the drum surface in accordance with data projector control logic 41 (FIG. 4).

A line of six or more digits desirably is presented onto the moving xerographic drum. The delay between the printing of the first digit and the last digit of a line results in a skew and displacement in the alignment of numeral information projected. To compensate for this, the axis of the data projector with reference to the drum axis is rotated a small amount. To accomplish this, the data projector is rotated about a pivot stud 320 through a small angle. For focusing, the data projector is movable along its optical path by extending or compressing a telescopic joint 326 or by raising or lowering the projector with micrometer screws 328. Also by rotating the telescopic joint 326 on its axis the image can be projected squarely on the drum thereby preventing any distortion of the characters.

JOURNAL TAPE ASSEMBLY—FIGS. 17–19

After the last cut sheet copy has been produced, another imaging cycle is made in which copy is produced onto a journal tape 193 which is moved into contact with the xerographic drum by a journal tape transport assembly 194 as will become more apparent hereinafter. Journal tape transport assembly 194 comprises a frame 809 supporting a supply roll 810 from which tape 193 is fed onto a take-up roll 820. Tape 193 is passed over a vertically displaceable idler roller 812 and then over another idler roller 814 before it is passed through a pair of pressure fixing rolls 816, 818 (FIG. 5) before being received onto a take-up roll 820.

A low level alarm is provided to indicate when tape 193 has been used up. To this end an arm 825 having a finger portion 827 is urged into contact with the periphery of supply roll 810 by an extension spring 829 for sensing the diameter of the supply roll. Extending from arm 825 is a pin 831 which contacts a microswitch MS-11 causing the microswitch to close which indicates that the journal tape has been used up by energizing any suitable alarm device, such as lamp LMP-18. Spring 829 is connected at one end to a pin 834 extending from the frame and at the other end to a pin 836 extending from arm 825 to urge the tip of finger 827, which may be of any suitable material, such as, nylon, into abutting relationship with the periphery of supply roll 810. In this manner a rotational drag is applied to the supply roll to maintain a control tension on the journal tape at all times.

Journal tape 193 is urged into pressure contact with the xerographic drum by displaceable roller 812. Roller 812 is connected to a support plate 837 by a pair of bearing support arms 838, 839. Support plate 837 is movable in a slot 841 formed in the main frame. Transfer corotron 195 is connected to support plate 837 by an angle plate 843 so as to move up and down in conjunction with displaceable roller 812. To adjust the proximity of corotron 195 to tape 193, angle plate 843 has an elongated slot 844 formed therein so as to be slidable along a bolt member 845 received in support plate 837.

During the journal tape portion of the recording cycle, journal tape 193 is advanced from the supply roll 810 onto the take-up roll 820 a predetermined amount sufficient to make one copy. At the same time the tape 193 is lowered into pressure contact with the drum and after the copy is made, retracted from the surface of the drum. In order to accomplish this movement of the journal tape a drive mechanism is provided with a clutching arrangement as will now be described. A chain 805 driven by drive motor MOT–1 drives a sprocket 845 connected to a rotatable shaft 847 which is journaled in the frame by a bearing support housing 849. Also secured to shaft 847 is a gear 850 which drives another gear 860 which is secured to a rotatable shaft 861 which carries a clutching assembly 863. Clutching assembly 863 comprises a hub member 865 mounted on rotatable shaft 861 by a pin 866 and a riven collar member 868 supported on bearing sleeve 869. A spring member 870 is wound around hub member 865 and driven collar member 868 in such a manner that as the spring contracts, drive motion is imparted to collar member 868, but when the spring is expanded, no motion is imparted. A movable control ring 872 having ratchet teeth 874 formed therein engages one end of spring member 870 causing the spring to expand when a finger 875 engages the ratchet teeth. On the other hand, when the ratchet teeth are disengaged, the spring is allowed to contract around driven collar member 868 imparting movement to it. When it is time for the journal tape copy to be made, finger 875 is disengaged from the ratchet teeth by the actuation of a rotary solenoid SOL-5 which receives a signal as will be explained hereinafter. At the same time, another finger 877 is disengaged from a cycling cam 878 for a purpose to be described.

When clutch assembly 863 is engaged, shaft 861 drives a gear 880 which meshes with another gear 881 which drives pressure roll 818 which together with pressure roll 816 serves to fix the image to the journal tape 193 in a manner to be more fully described hereinafter. At the same time, a shaft 882 positioned on an axis coaxial with pressure roll 818 is driven through a gear train made up of gears 883, 884 and 885. Shaft 882 drives a pulley 887 which in turn drives another pulley 888 through a slip belt 889, pulley 888 being connected to a rotatable shaft 890, on which takeup roll 820 is mounted. Also mounted on shaft 882 is cycling cam 878 which is engaged by a pin 876 on finger 877 after completing one revolution to stop the movement of shaft 882 and hence the movement of the journal tape. It will be readily appreciated that slip belt 889 is able to slop around pulleys 887, 888 to permit tape 193 to be wound onto take-up roll 820 as fast as it is advanced. Also carried by shaft 882 is a lobe cam 892 which has a raised portion 893 for engaging a cam follower 894. Cam follower 894 is fixed to movable support plate 837 to raise and lower idler roll 812 and corotron 195 according to the profile of lobe cam 894. It should be noted that lobe cam 894 raises support plate 837 with idler roll 812 and corotron 195 and holds it in the retracted position at the time that cycling cam 878 completes one revolution and by its profile allows fingers 872, 875 to swing clockwise. When this occurs finger 875 engages ratchet teeth 874 causing the clutch to disengage and the motion to stop.

PRESSURE FIXING MECHANISM—
FIGS. 4 AND 22–24

Both the cut sheet copies and the journal tape are passed through pressure fixing devices in the form of a pair of pressure rolls. One of the pressure rolls is driven and the other is an idler roll which exerts very high pressures at the nip due to a mechanical lever action as will now be described. Since each of the pressure roll devices is similar in operation, the pressure fixing operation of pressure rolls 186, 187 will be described in detail, it being understood that the pressure fixing operation of pressure rolls 816 and 818 is similar.

Idler roll 186 comprises an outer cylindrical member 375 which is supported by bearings 376 set in a core member 378 to allow cylindrical member 375 to be rotatable on the core member. Core member 378 is rotatably journaled in the main frame on a pair of undercut extensions 380, 382 which are on an axis eccentric to the axis of the core member 378. A lever arm 383 is gripped tightly amount extension 380 by means of a clamping screw 385 and has a force exerted at the opposite end by a compression spring 386. A bolt member 388 which is passed through a slot 389 in arm 383 and received in the frame serves to compress spring 386 which bears on the face of arm 383 thereby effecting the desired pressure for fixing the image to its support sheet.

In operation pressure rolls 186, 187 are aligned to contact one another. Drive is imparted to pressure roll 187 by a shaft 391 which is driven by a gear 392 which meshes with gear 850 continuously driven through the main drive motor MOT-1. Also mounted on shaft 391 is a pulley 393 which drives a timing belt 394 which in turn drives another pulley 395 which is mounted coaxially on a shaft 396 driving transport roll 190. After a cut sheet is passed through pressure rolls 186, 187, it is received by transport rolls 190, 191 which push it out of housing 11 through slot 192. To adjust the fixing pressure bolt member 388 is screwed down into the frame to compress spring 386 thereby applying a moment force to cylindrical member 375. In this manner very high pressures which depend upon the amount of eccentricity of the extensions and the length of moment arm 383 can be applied at the nip of the pressure rolls 186, 187. It will be appreciated that as roll 187 is driven by timing belt, a very high pressure will be exerted uniformly along the length of the pressure rolls to produce a high quality fix of the image to the paper support. It should be understood that in the case of paper widths which are larger than usual, that a moment arm and an associated compression spring can be positioned at each end of the idler roll rather than at one end as shown in the drawings.

MACHINE OPERATION

The apparatus disclosed enables the recording of merchandise control and accounts receivable information at the point of sale in machine readable language. More than this, it provides readable record receipts for both the customer and business concern.

A clear understanding of the operation of the recording apparatus and of the electrical logic circuit for controlling the various components can best be obtained by reference to the block diagram of FIG. 4, the schematic wiring circuits of FIGS. 22 and 23 and the timing diagram of FIG. 24.

For a normal transaction, the operator inserts merchandise tickets and a charge plate, in case of a charge, into slots on order board 104. Slide members 241, 243 are moved appropriately to indicate a CASH or CHARGE and TAKE or SEND situation with a corresponding input signal to memory and digital processor 30. Next the operator keys in item price(s), subtotal, tax, special charges, if any, and total. As the corresponding buttons 17 on keyboard 15 are depressed, each item, subtotal, etc., is displayed visibly on display 19. In case of a mistake, the CLEAR button is depressed thus clearing the temporary accumulator register section of an incorrect entry. When the keyboard input operation is completed the operator inserts the order board into slot 27 of the transaction recorder where it is received by order board carriage assembly 110. The order board carriage frame 410 has settable counter 425 to indicate the transaction number and slot 427 where the recorder department number and sales date are inserted. Hence this information is also recorded as illustrated in FIG. 9.

Upon insertion of the order board in the recorder, a microswitch MS-1 is closed causing sensor lamps LMP 10-15 to be energized. Photocells 442 under the carriage frame generate signals to memory and digital processor 30 in response to illumination from these lamps according to the conditional request established by the position of slide members 241, 243 and the credit card on the order board.

The print command is entered to memory and digital processor 30 upon pressing the PRINT button. Upon receipt of binary coded signals from the keyboard circuit and signals generated from photocells 442, memory and digital processor 30 instructs copier control logic 40 on the number of copies to be produced in accordance with a three-bit binary code in the memory of the processor as follows:

1 copy plus journal=001
2 copies plus journal=010
3 copies plus journal=011
4 copies plus journal=100
journal (SUPERVISORY)=110
1 copy plus journal (NO SALE)=111

When the PRINT button is depressed, an output 920 is supplied via gate 921 to energize the electromechanical circuit of the recorder by energizing a relay 1CR. At the same time a reset pulse 923 initializes flip-flop 925 to prevent an output signal at 927 which is coupled to a journal tape relay 3CR at the proper time as will be explained hereinafter. A three bit binary code in the form of signals 931, 932 and 933 are gated together in OR gates 935 and 936. OR gate 935 combines pulses from a four lobe cam 621, a three lobe cam 622, and a two lobe cam 623. Gate 936 combines pulses from three lobe cam 622 and the two lobe cam 623. Outputs from gates 935 and 936 are applied to AND gates 937 and 938. Another pair of AND gates 940 and 941 serve to detect two different binary coded numbers corresponding to the supervisory and no-sale conditions, respectively. If gate 940 is active it enables gate 937. On the other hand, if gate 941 is active it enables gate 938. It will be noted that when one of AND gates 937, 938 and 939 is enabled, the other two are disabled. Whichever gate 937, 938, 939 is active provides a signal output to a one shot 950 via OR gate 951. Hence for each type of transaction i.e., regular, supervisory, no sale, just one of AND gates 937, 938, 939 is enabled and hence only a signal corresponding to that particular transaction will be transmitted as a data request condition to memory and digital processor 30.

Concurrent with the signals supplied from cams 621, 622 and 623 is a signal from a one lobe cam 626 which is designated as a print count cam. Print count cam 626 serves to supply signals to a copy counter 960 via a one shot 962. Copy counter 960 supplies outputs X,Y,Z, $\overline{X}$, $\overline{Y}$ and $\overline{Z}$ to a comparator 965 which compares this input with information received from binary coded signals 931, 932, 933. When the counts agree, an output is produced from the comparator which sets flip-flop 925 via OR gate 967. When flip-flop 925 is in the set condition output signal 927 is produced to energize the journal tape relay 3CR. For a no sale condition a signal from copy counter 960 is supplied into flip-flop 925 via AND gate 969 after one copy is produced. When the recording is ended, a gate 971 detects this condition and is utilized to disable flip-flop 925 via a gate 973, and disable a gate 975 which supplies an output to memory and digital processor 30 via a gate 977. At the same time gate 971 serves to reset copy counter 960 and flip-flop 925. When relay 1CR becomes energized, it closes contacts 1CR-1, 1CR-2 and 1CR-3 to energize main drive motor MOT-1, exposure lamps LMP-1 and LMP-2, discharge lamp LMP-3, tape transfer corotron 172, print transfer corotron 195, and charge corotron 150. At the same time in a 24-volt circuit contact 1CR-3 closes to enable a circuit to solenoid SOL-1 through a voltage dropping Zener diode 990.

Through a chain drive 900, xerographic drum 202, paddle wheel 160, cleaning brush 198 start and stop with motor MOT-1. Power is available to the journal tape fuser roll and web feed and cutter assembly 170 through clutches operated by solenoids SOL-5 and SOL-2, respectively. All machine functions are timed by cams mounted for rotation on the drum shaft. Hence all synchronization and timing is directly related to the drum position and is not dependent on timing out or synchronization within the electronic circuit described above.

For purposes of this discussion the timing of all events is expressed in angular degrees of drum rotation. The leading edge of the imaging section on the drum may be considered as a fix "stop-start" position since one copy is produced for each drum revolution. After the drum rotates 5 degrees a scan control cam 620 closes a microswitch MS-2 which shorts out Zener diode 990 causing scan control solenoid SOL-1 to be actuated. About 10 milliseconds later microswitch MS-2 opens causing solenoid SOL-1 to remain energized by partial voltage thereby preventing overheating. At the 25-degree position the drum imaging section passes charge corotron 150. Next cams 621, 622 and 623 on the drum shaft generate pulses to copier control logic 40 to trigger the data projector via data projector control logic 41 depending upon the particular type of transaction as previously described.

At approximately the 66 degree position of drum rotation dog 485 on the drum engages the order board carriage scan drive. The order board is pulled into the machine and at the 90-degree drum position the leading edge of the order board arrives at the imaging zone of optical assembly 115. During the next 160 degrees of rotation the image on the moving order board is projected onto the moving drum surface. After the drum has been rotated for about 130 degrees the leading edge of the image arrives at the development station at which the latent electrostatic image is developed.

At approximately the 180-degree position of drum rotation, the transfer control cam 624 causes a microswitch MS-4 to close to energize a solenoid SOL-4 which opens gate 169 and holds it open for the next 160 degrees of drum rotation. This enables register rolls 167, 168 to move a cut sheet into contact with the surface of the drum. Next the drum and cut sheet pass under transfer corotron 172 where image transfer is effected. Following this the cut sheet copy passes under the retracted journal tape 193 and its transfer corotron 195 and is stripped from the drum at about the 275-degree position by the action of plungers 180.

Delivery of a cut sheet from web feed and cutter assembly 170 is controlled by a microswitch MS-15 which senses the presence or absence of a cut sheet. When a cut sheet is absent, microswitch MS-15 is closed causing a signal to be supplied to sheet feed solenoid SOL-2. On the other hand when a sheet is present it buckles upwardly due to closed gate 169 opening microswitch MS-15 thereby disabling sheet feed solenoid SOL-2. To ensure a space between the trailing edge of a cut sheet being transferred and the leading edge of the next sheet, a cam 625 causes a microswitch MS-6 in series with microswitch MS-15 to close enabling sheet feed solenoid SOL-2 to become energized at about the 210-degree position.

As previously mentioned print count cam 626 causes a microswitch to close sending a single pulse at the 100-degree position to copy counter 960 which supplied outputs X, Y and Z to comparator 965 which counts down to zero from a predetermined number established by binary coded signals 931, 932, 933. Comparator 965 determines when the proper number of cut sheets have been printed and energizes relay 3CR via flip-flop 925 enabling energization of relay 4CR via contact 3CR-2. When this occurs solenoid SOL-4 is deenergized by opening normally closed contact 4CR–2 thereby inhibiting gate 169 from opening to ensure no more cut sheet copies are produced. At the same time relay 1CR is deenergized causing each of drive motor MOT–1, print transfer corotron power supply PS–2, transfer corotron power supply PS–1, scan drive solenoid SOL–1 and charge corotron power supply PS–3 to become deenergied. It should be noted that drive motor MOT–1 and transfer corotron power supply PS–3 are reenergized by closing contact 4CR–1.

A journal tape cam 627 causes a microswitch MS–8 to generate a long pulse (0.5 to 2.0 seconds) starting at the 240-degree position. Journal tape control solenoid SOL–5 ignores this pulse until signal 927 is received to energize relay 3CR which closes contacts 3CR–1 and 3CR–2 enabling the journal tape assembly to be actuated. At approximately the 355-degree position, an "end of cycle" cam 628 causes a microswitch MS–9 to send a pulse which is ignored until completion of the journal tape run after which relay 3CR is deenergized. On the next actuation of MS–9 relay 4CR–1 is deenergized causing the main drive motor MOT–1 to be deenergized and stopping the drum at the "stop-start" position. At the same time a signal is supplied for energizing solenoid SOL–7 to open cash drawer 25. At this time, power supply PS–1, journal tape transfer corotron 195, exposure lamps LMP–1 and LMP–2 and discharge lamp LMP–3 are all deenergized. During the final run-out cycle the drum passes discharge lamp LMP–3 and cleaning brush 198 to arrive cleaned at the stop-start position. The recorder is now in condition for another recording cycle as previously described.

A no sale condition allows cash drawer 25 to be opened without any sale being recorded. To accomplish this the order board is set to a CASH-TAKE situation or any other suitable preestablished logic before being inserted into the carriage assembly. Following this the NO SALE button is depressed. The processor responds to cycle the journal tape and energize solenoid SOL–6 which inhibits an advance of transaction counter 425. Also the cash drawer to open command is given by the processor to energize solenoid SOL–7 thereby opening cash drawer 25. Data projector 152 displays all zeros which are recorded onto the journal tape and display 19 shows all the zeros.

Supervisory lock controls are provided on the recorder so that when a transaction is not in progress, all accumulators in memory and digital processor 30 may be recorded onto the journal tape. This is accomplished by inserting a key into PRINT ACCUMULATOR key operated switch 28 and rotating the key through 90 degrees. A request for print-out of accumulators is sensed by the processor as previously described. In this operation the accumulators of the memory and processor 30 are not reset, and so will continue to hold all the information even after print-out of the contents. PRINT and RESET ACCUMULATOR key operated switch 29 enables the same printing operation to occur but in this case the accumulators of memory and digital processor 30 are reset.

While the instant invention as to its objects and advantages has been described herein as carried out in a specific embodiment thereof, it is not desired to be limited thereby; but it is intended to cover the invention broadly within the scope of the appended claims.

What is claimed is:

1. Recording apparatus comprising
   a photoreceptor member adapted for movement along a predetermined path,
   keyboard means having a plurality of keys for generating signals representing predetermined digital information,
   platen means positioned in a first object plane and adapted to receive document information to be scanned,
   carriage means to receive and move said platen means past a light scanning station to project a flowing image of said document information onto said photoreceptor member,
   drive means to move said photoreceptor member and carriage means in timed relation,
   data display means positioned in a second object plane operative to display varying indicia in response to predetermined digital information signals,
   light directing means associated with said data display means to cause light rays to strike said moving photoreceptor member in a predetermined area complementary with the image formed at said scanning station thereby forming a composite image, and
   logic circuit means including digital information storage unit for supplying digital information signals seratim to said data display means in timed relation to the movement of said photoreceptor member representative of varying indicia according to the operation of said keys, whereby multiple inputs one of which is stored for a sequential varying display and the other which is fixed may be combined together as composite images.

2. Apparatus according to claim 1 wherein said photoreceptor member is a xerographic plate moved past xerographic processing stations including at least two transfer stations to produce multiple copies of said composite images, the number of said copies being in response to discrete signals emitted from said logic circuit means in accordance with a preset value established by a machine operator.

3. Apparatus according to claim 2 wherein at least one of said xerographic transfer stations is for the transfer of images onto cut sheets and another is for the transfer of images onto a journal tape, said transfer stations being separately operable in response to discrete signals from said logic circuit means.

4. A business machine for recording a completed sale at the point of sale comprising
   a photoreceptor member adapted for movement along a predetermined path,
   keyboard means having a plurality of amount and control keys for generating signals representing predetermined digital information,
   platen means positioned in a first object plane and adapted to receive a plurality of cards bearing machine readable indicia representing merchandise control and accounts receivable information,
   carriage means to receive and move said platen means past a light scanning station to project a flowing image of said document information onto said photoreceptor member.
   drive means to move said photoreceptor member and carriage means in timed relation,
   data display means positioned in a second object plane operative to display machine readable indicia representing item amount, subtotal, tax, special charges, if any, and total information in response to predetermined digital information signals,
   light directing means associated with said data display means to cause light rays to strike said moving photoreceptor member in a predetermined area complementary with an image formed at said scanning station to thereby form a composite image, and
   logic circuit means including a digital information storage unit for supplying digital information seriatim to said data display means in timed relation to the movement of said photoreceptor member to display indicia as aforementioned according to the operation of said keys whereby multiple inputs one of which is stored for a sequential varying display and the other which is fixed may be combined together as machine readable composite images.

5. A data processing system comprising
   a xerographic photoreceptor member adapted for movement along a predetermined path, drive means for continuously moving said photoreceptor member past a plurality of processing stations, keyboard means having keys for generating signals representing predetermined digital information, a first imaging system at a first processing station for imaging fixed document information moved in a first object plane onto said photoreceptor, said fixed document information including strips of light absorbing material in predetermined spaced apart areas a second imaging system at a second processing station for imaging variable information from a variable display device in a second object plane onto said photoreceptor in alignment with areas corresponding to the strips of light absorbing material in response to predetermined digital information signals, and logic circuit means including a digital information storage unit responsive to the operation of said keys for supply digital information signals seriatim to said variable display device to form composite images of variable sequential information and fixed document information onto said photoreceptor in timed relation to the movement thereof.

6. A system according to claim 5 wherein said photoreceptor member is a xerographic drum moved past xerographic processing stations including at least two transfer stations to produce multiple copies of said composite images, the number of said copies being in response to discrete signals emitted from said logic circuit means in accordance with a preset value established by a machine operator.

7. A system according to claim 6 wherein at least one of said xerographic transfer stations is for the transfer of images onto cut sheets and another is for the transfer of images onto a journal tape to be utilized for on-line computer processing, said transfer station being separately operable in response to discrete signals from said logic circuit means in accordance with the number and type of copies to be reproduced.

References Cited

UNITED STATES PATENTS

| | | | |
|---|---|---|---|
| 2,364,188 | 12/1944 | Bryce | 355—42 |
| 3,042,919 | 7/1962 | Simjian | 95—1.1 XR |
| 3,090,287 | 5/1963 | Ritterfeld | 355—3 |
| 3,094,036 | 6/1963 | Benson | 355—7 |
| 3,334,539 | 8/1967 | Kleist | 355—64 XR |
| 3,417,681 | 12/1968 | Lemelson | 95—1.1 |

JOHN M. HORAN, Primary Examiner

U.S. Cl. X.R.

95—1.1; 355—40, 64